US012686125B2

(12) United States Patent
Yamamoto et al.

(10) Patent No.: US 12,686,125 B2
(45) Date of Patent: Jul. 21, 2026

(54) ROBOT SYSTEM WITH STORED POSITION INFORMATION OF SENSOR

(71) Applicant: KABUSHIKI KAISHA YASKAWA DENKI, Kitakyushu (JP)

(72) Inventors: Akihiro Yamamoto, Fukuoka (JP); Shingo Ando, Fukuoka (JP); Masaru Adachi, Fukuoka (JP); Keita Shimamoto, Fukuoka (JP); Jiro Muraoka, Fukuoka (JP)

( * ) Notice: Subject to any disclaimer, the term of this patent is extended or adjusted under 35 U.S.C. 154(b) by 62 days.

(21) Appl. No.: 18/788,129

(22) Filed: Jul. 30, 2024

(65) Prior Publication Data

US 2024/0383142 A1 Nov. 21, 2024

Related U.S. Application Data

(63) Continuation of application No. PCT/JP2022/004304, filed on Feb. 3, 2022.

(51) Int. Cl.
B25J 9/16 (2006.01)
B25J 9/10 (2006.01)

(52) U.S. Cl.
CPC .............. B25J 9/1664 (2013.01); B25J 9/106 (2013.01)

(58) Field of Classification Search
CPC ........ B25J 9/1664; B25J 9/106; B25J 9/1641; B25J 9/1692; B25J 13/08; B25J 13/088; B25J 19/02
See application file for complete search history.

(56) References Cited

U.S. PATENT DOCUMENTS

| | | | |
|---|---|---|---|
| 2004/0164697 A1 | 8/2004 | Iribe | |
| 2005/0103738 A1* | 5/2005 | Recktenwald | ........ B66C 13/063 |
| | | | 212/275 |
| 2005/0240307 A1 | 10/2005 | Kuroki et al. | |
| 2015/0081095 A1 | 3/2015 | Shiraki et al. | |
| 2019/0344440 A1 | 11/2019 | Yamaoka et al. | |
| 2023/0150128 A1* | 5/2023 | Mottram | ................ A61B 34/20 |
| | | | 700/253 |
| 2024/0123623 A1* | 4/2024 | Hayashi | ................... B25J 19/06 |

FOREIGN PATENT DOCUMENTS

| | | |
|---|---|---|
| CN | 105252539 | 1/2016 |
| CN | 109366480 | 2/2019 |
| JP | 2004-148499 | 5/2004 |
| JP | 2004-188535 | 7/2004 |
| JP | 2005-316937 | 11/2005 |
| JP | 2012-196749 | 10/2012 |

(Continued)

OTHER PUBLICATIONS

International Search Report dated Apr. 26, 2022 for PCT/JP2022/004304.

(Continued)

*Primary Examiner* — Dylan M Katz
(74) *Attorney, Agent, or Firm* — SHIPWAY IP

(57) ABSTRACT

A robot system includes: a first link that is a part of a robotic arm; a first motor that moves according to a rotation of the first link; a first sensor having a fixed location with respect to the first motor; and a memory configured to store first position information indicating a relative position of the first sensor with respect to a first reference position of the first motor.

20 Claims, 8 Drawing Sheets

(56)  References Cited

FOREIGN PATENT DOCUMENTS

| JP | 2017-056542 | 3/2017 |
| JP | 2019-195871 | 11/2019 |
| JP | 2021-137928 | 9/2021 |
| WO | 2013/175553 | 11/2013 |
| WO | 2021/136565 | 7/2021 |

OTHER PUBLICATIONS

International Preliminary Report on Patentability with Written Opinion dated Aug. 15, 2024 for PCT/JP2022/004304.

* cited by examiner

ROBOT SYSTEM WITH STORED POSITION INFORMATION OF SENSOR

CROSS-REFERENCE TO RELATED APPLICATIONS

This application is a continuation application of PCT Application No. PCT/JP2022/004304, filed on Feb. 3, 2022. The entire contents of the above listed PCT and priority applications are incorporated herein by reference.

BACKGROUND

Field

The present disclosure relates to a robot system and a sensing method.

Description of the Related Art

Japanese Unexamined Patent Publication No. 2004-188535 discloses a robot in which sensors for detecting an actuator driving state, such as a position sensor, an acceleration sensor, an angular velocity sensor, and a torque sensor, are built into each joint actuator device.

SUMMARY

Disclosed herein is a robot system. The robot system may include: a first link that is a part of a robotic arm; a first motor that moves according to a rotation of the first link; a first sensor having a fixed location with respect to the first motor; and a memory configured to store first position information indicating a relative position of the first sensor with respect to a first reference position of the first motor.

DETAILED DESCRIPTION

In the following description, with reference to the drawings, the same reference numbers are assigned to the same components or to similar components having the same function, and overlapping description is omitted.

Robot System

Figure 1:
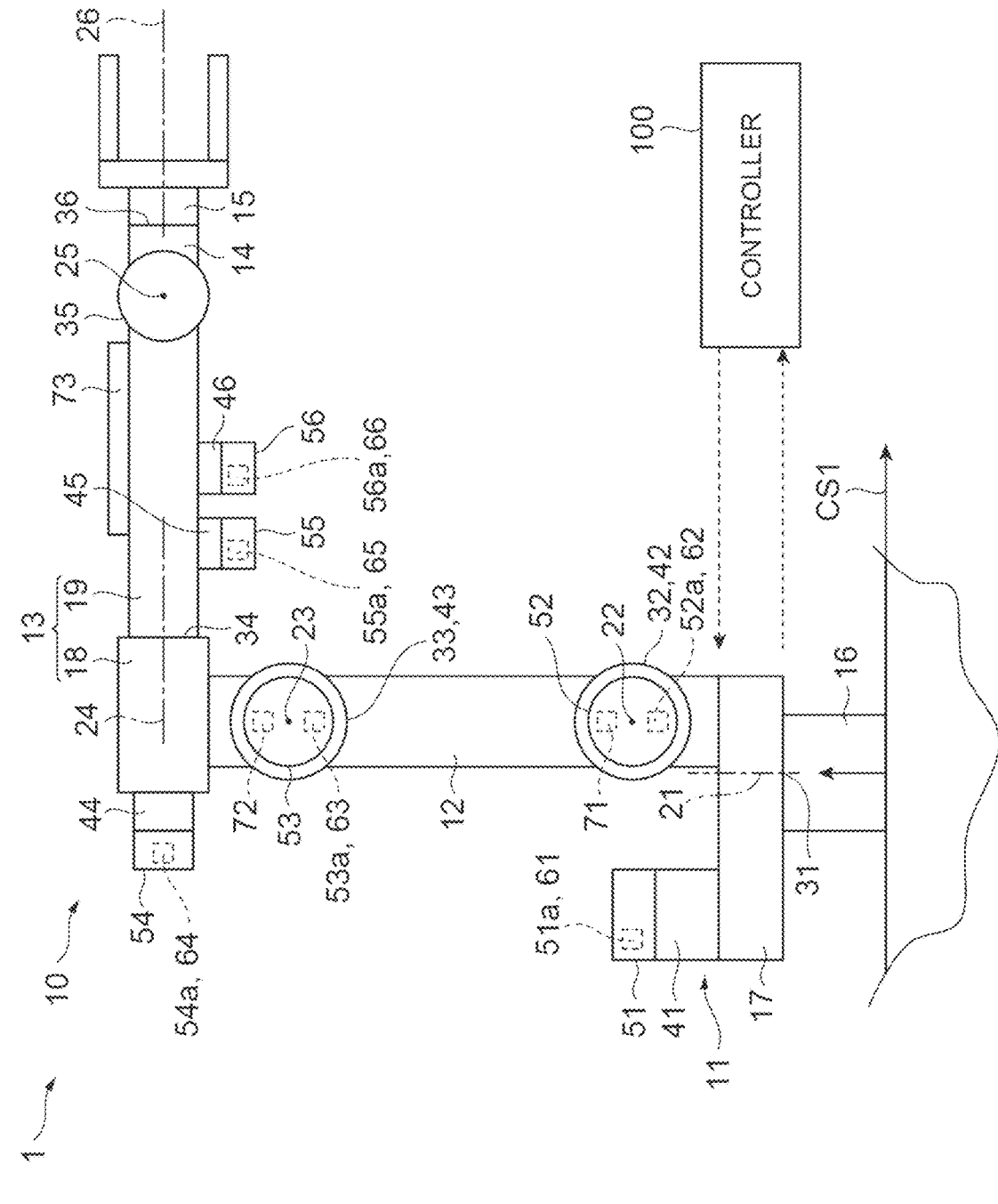
FIG. 1 is a schematic diagram illustrating an example configuration of a robot system.

A robot system 1 illustrated in FIG. 1 is, for example, an industrial robot system, and executes tasks such as conveyance of a workpiece, processing on a workpiece, and assembly. For example, the robot system 1 includes a robotic arm 10 and a controller 100.

The robotic arm 10 is, for example, a six-axis vertical articulated robot, and includes a robot base 11, an arm 12, an arm 13, a wrist portion 14, a tip portion 15, motors 41, 42, 43, 44, 45, 46, and encoders 51, 52, 53, 54, 55, 56. The robot base 11 is mounted on a floor surface, a wall surface, a ceiling surface, or the like of a work space. The robot base 11 may be mounted on a movable surface such as an upper surface of an automated guided vehicle.

The robot base 11 includes a base 16 and a pivoting portion 17. The base 16 is fixed to a mounting surface such as the floor surface, the wall surface, the ceiling surface, or the upper surface of the automated guided vehicle described above. For example, in FIG. 1, the base 16 is fixed to a horizontal floor surface. In the following description, "up and down" means up and down in a case where the base 16 is fixed on a horizontal floor surface.

The pivoting portion 17 may be mounted on the base 16 so as to be rotatable around an axis 21 that is vertical (the axis 21 perpendicular to the mounting surface). Thus, a joint 31 is formed between the base 16 and the pivoting portion 17, and the base 16 rotatably supports the pivoting portion 17.

The arm 12 is connected to the pivoting portion 17 so as to be rotatable around an axis 22 intersecting (for example, orthogonal to) the axis 21. Intersecting includes being skewed, as in so-called three-dimensional intersections. The same applies to the following. Thus, a joint 32 is formed between the pivoting portion 17 and the arm 12, and the pivoting portion 17 rotatably supports the arm 12. The arm 12 extends so as to intersect (for example, be orthogonal to) the axis 22.

The arm 13 is connected to an end of the arm 12 so as to be rotatable around an axis 23 parallel to the axis 22. Thus, a joint 33 is formed between the arm 13 and the arm 12, and the arm 12 rotatably supports the arm 13. The term "support" includes direct support and indirect support. For example, the arm 13 is also supported by the pivoting portion 17 via the arm 12. The arm 13 extends along an axis 24 that intersects (for example, is orthogonal to) the axis 23.

The arm 13 includes an arm base 18 and an arm end 19. The arm base 18 is connected to the end of the arm 12 so as to be rotatable around the axis 23. The arm end 19 is connected to an end of the arm base 18 so as to be rotatable around the axis 24 and extends along the axis 24. Thus, a joint 34 is formed between the arm end 19 and the arm base 18, and the arm base 18 rotatably supports the arm end 19.

The wrist portion 14 is connected to an end of the arm end 19 so as to be rotatable around an axis 25 that intersects (for example, is orthogonal to) the axis 24. Thus, a joint 35 is formed between the wrist portion 14 and the arm end 19, and the arm end 19 rotatably supports the wrist portion 14. The wrist portion 14 extends along an axis 26 that intersects (for example, is orthogonal to) the axis 25.

The tip portion 15 is connected to the end of the wrist portion 14 so as to be rotatable around the axis 26. Thus, a joint 36 is formed between the tip portion 15 and the wrist portion 14, and the wrist portion 14 rotatably supports the tip portion 15. A tool that acts on the workpiece is provided at the tip portion 15. Specific examples of the tool include a hand for gripping a workpiece, a processing tool (for example, a welding torch or a painting gun) for a workpiece, and an assembly tool (for example, a screw tightening tool).

The motors 41, 42, 43, 44, 45, 46 drive the joints 31, 32, 33, 34, 35, 36, respectively. The motor 41 is a "base motor" fixed to the robot base 11. By way of example, the motor 41 is fixed to the pivoting portion 17. The motor 41 may be fixed to the base 16.

The motor 41 is supplied with power to rotate the pivoting portion 17 around the axis 21. The motor 42 is fixed to the pivoting portion 17 at the joint 32 and moves with the rotation of the pivoting portion 17. In this relationship, the pivoting portion 17 is a "first link", the motor 41 is a "second motor" that rotates the "first link", and the motor 42 is a "first motor" which moves with the rotation of the "first link". The motor 42 may be fixed to the arm 12.

The motor 42 is supplied with power to rotate the arm 12 around the axis 22. The motor 43 is fixed to the arm 12 at the joint 33 and moves with the rotation of the arm 12. The motor 43 also moves with the rotation of the pivoting portion 17. In this relationship, the arm 12 is the "first link" and the pivoting portion 17 is a "second link" that rotatably supports the "first link". The motor 42 is the "second motor" that rotates the "first link", and the motor 43 is the "first motor" that moves by the rotation of the "first link". The motor 43 may be fixed to the arm base 18.

The motor 43 is supplied with power to rotate the arm base 18 around the axis 23. The motor 44 is fixed to the arm base 18 and moves with the rotation of the arm base 18. The motor 44 also moves with the rotation of the pivoting portion 17 and the rotation of the arm 12. In this relationship, the arm base 18 is the "first link" and the arm 12 is the "second link" that rotatably supports the "first link". The motor 43 is the "second motor" that rotates the "first link", and the motor 44 is the "first motor" that moves with the rotation of the "first link". The motor 44 may be fixed to the arm end 19.

The motor 44 is supplied with power to rotate the arm end 19 around the axis 24. The motors 45, 46 are fixed to the arm end 19 and move with the rotation of the arm end 19. The motors 45, 46 also move with the rotation of the pivoting portion 17, the rotation of the arm 12, and the rotation of the arm base 18. In this relationship, the arm end 19 is the "first link" and the arm base 18 is the "second link" that rotatably supports the "first link". The motor 44 is the "second motor" that rotates the "first link", and the motors 45, 46 are the "first motors" that move with the rotation of the "first link". The motor 45 is supplied with power to rotate the wrist portion 14 around the axis 25. The motor 46 is supplied with power to rotate the tip portion 15 around the axis 26.

The arrangement of the motors is merely an example, and can be modified. For example, the motor 46 may be fixed to the wrist portion 14. The motor 46 moves with the rotation of the wrist portion 14. The wrist portion 14 is the "first link", and the arm end 19 is the "second link" that rotatably supports the "first link". The motor 45 is the "second motor" that rotates the "first link", and the motor 46 is the "first motor" that moves with the rotation of the "first link". The motor 46 also moves with the rotation of the pivoting portion 17, the rotation of the arm 12, the rotation of the arm base 18, and the rotation of the arm end 19 (the second link).

The motors 45, 46 may be fixed to the arm base 18. Similarly to the motor 44, the motors 45, 46 move with the rotation of the arm base 18 (first link).

The encoders 51, 52, 53, 54, 55, 56 detect the rotation of the motors 41, 42, 43, 44, 45, 46 respectively. For example, the encoder 51 is fixed to the motor 41 and detects the rotational angle of the motor 41 for rotating the pivoting portion 17 around the axis 21. For example, the encoder 51 is fixed to a stator of the motor 41 and detects a rotational angle of a rotor of the motor 41. The encoder 51 is a "base encoder" fixed to a "base motor", and is also a "second encoder" fixed to the "second motor".

The encoder 52 is fixed to the motor 42 and detects the rotational angle of the motor 42 for rotating the arm 12 around the axis 22. For example, the encoder 52 is fixed to a stator of the motor 42 and detects a rotational angle of a rotor of the motor 42. The encoder 52 is a "first encoder" fixed to the "first motor", and is also the "second encoder" fixed to the "second motor".

The encoder 53 is fixed to the motor 43 and detects the rotational angle of the motor 43 for rotating the arm base 18 around the axis 23. For example, the encoder 53 is fixed to a stator of the motor 43 and detects a rotational angle of a rotor of the motor 43. The encoder 53 is the "first encoder" fixed to the "first motor", and is also the "second encoder" fixed to the "second motor".

The encoder 54 is fixed to the motor 44 and detects the rotational angle of the motor 44 for rotating the arm end 19 around the axis 24. For example, the encoder 54 is fixed to a stator of the motor 44 and detects a rotational angle of a rotor of the motor 44. The encoder 54 is the "first encoder" fixed to the "first motor", and is also the "second encoder" fixed to the "second motor".

The encoder 55 is fixed to the motor 45 and detects the rotational angle of the motor 45 for rotating the wrist portion 14 around the axis 25. For example, the encoder 55 is fixed to a stator of the motor 45 and detects a rotational angle of a rotor of the motor 45. The encoder 55 is the "first encoder" fixed to the "first motor". If the motor 46 is fixed to the wrist portion 14, the encoder 55 is also the "second encoder" fixed to the "second motor".

The encoder 56 is fixed to the motor 46 and detects the rotational angle of the motor 46 for rotating the tip portion 15 around the axis 26. For example, the encoder 56 is fixed to a stator of the motor 46 and detects a rotational angle of a rotor of the motor 46. The encoder 56 is the "first encoder" fixed to the "first motor".

Separately from the encoders 51, 52, 53, 54, 55, 56, the robotic arm 10 further includes sensors 61, 62, 63, 64, 65, 66. The sensor 61 has a fixed relative position with respect to the motor 41. The sensor 61 is a "base sensor" having a fixed relative position with respect to the "base motor", and is the "second sensor" having a fixed relative position with respect to the "second motor". For example, the sensor 61 is built into the encoder 51 and is fixed at a sensing position 51a in the encoder 51. The sensor 61 is an acceleration sensor, and detects acceleration of the sensing position 51a. The sensor 61 may be built into the motor 41.

The sensor 62 has a fixed relative position with respect to the motor 42. The sensor 62 is a "first sensor" having a fixed relative position with respect to the "first motor", and is the "second sensor" having a fixed relative position with respect to the "second motor". For example, the sensor 62 is built into the encoder 52 and is fixed at a sensing position 52a in the encoder 52. The sensor 62 is an acceleration sensor, and detects acceleration of the sensing position 52a. The sensor 62 may be built into the motor 42.

The sensor 63 has a fixed relative position with respect to the motor 43. The sensor 63 is the "first sensor" having a fixed relative position with respect to the "first motor", and is the "second sensor" having a fixed relative position with respect to the "second motor". For example, the sensor 63 is built into the encoder 53 and is fixed at a sensing position 53a in the encoder 53. The sensor 63 is an acceleration sensor, and detects acceleration of the sensing position 53a. The sensor 63 may be built into the motor 43.

The sensor 64 has a fixed relative position with respect to the motor 44. The sensor 64 is the "first sensor" having a fixed relative position with respect to the "first motor", and is the "second sensor" having a fixed relative position with respect to the "second motor". For example, the sensor 64 is built into the encoder 54 and is fixed at a sensing position 54a in the encoder 54. The sensor 64 is an acceleration sensor, and detects acceleration of the sensing position 54a. The sensor 64 may be built into the motor 44.

The sensor 65 has a fixed relative position with respect to the motor 45. The sensor 65 is the "first sensor" having a fixed relative position with respect to the "first motor". If the motor 46 is fixed to the wrist portion 14, the sensor 65 is the "second sensor" having a fixed relative position with respect to the "second motor". For example, the sensor 65 is built into the encoder 55 and is fixed at a sensing position 55a in the encoder 55. The sensor 65 is an acceleration sensor, and detects acceleration of the sensing position 55a. The sensor 65 may be built into the motor 45.

The sensor 66 has a fixed relative position with respect to the motor 46. The sensor 66 is the "first sensor" having a fixed relative position with respect to the "first motor". For example, the sensor 66 is built into the encoder 56 and is fixed at a sensing position 56a in the encoder 56. The sensor 66 is an acceleration sensor, and detects acceleration of the sensing position 56a. The sensor 66 may be built into the motor 46.

The robotic arm 10 may further include another sensor (other sensor) in addition to the encoders 51, 52, 53, 54, 55, 56 and the sensors 61, 62, 63, 64, 65, 66. For example, the robotic arm 10 includes a torque sensor 71, a torque sensor 72, and a contact sensor 73. The torque sensor 71 detects the torque acting between the pivoting portion 17 and the arm 12 at the joint 32. The torque sensor 72 detects the torque acting between the arm base 18 and the arm 12 at the joint 33. The contact sensor 73 detects contact between the arm end 19 and the peripheral object.

The configuration of the robotic arm 10 illustrated in FIG. 1 is merely an example. The configuration of the robotic arm 10 can be modified as long as the robotic arm 10 includes one or more links (first link) and a motor (first motor) that moves with the rotation of the link. For example, the robotic arm 10 may be a redundant articulated robot in which one or more joints are added to the above-described six joints, or may be a so-called Selective Compliance Assembly Robot Arm (SCARA) articulated robot. Further, the robotic arm 10 may be a parallel link type robot.

Figure 2:
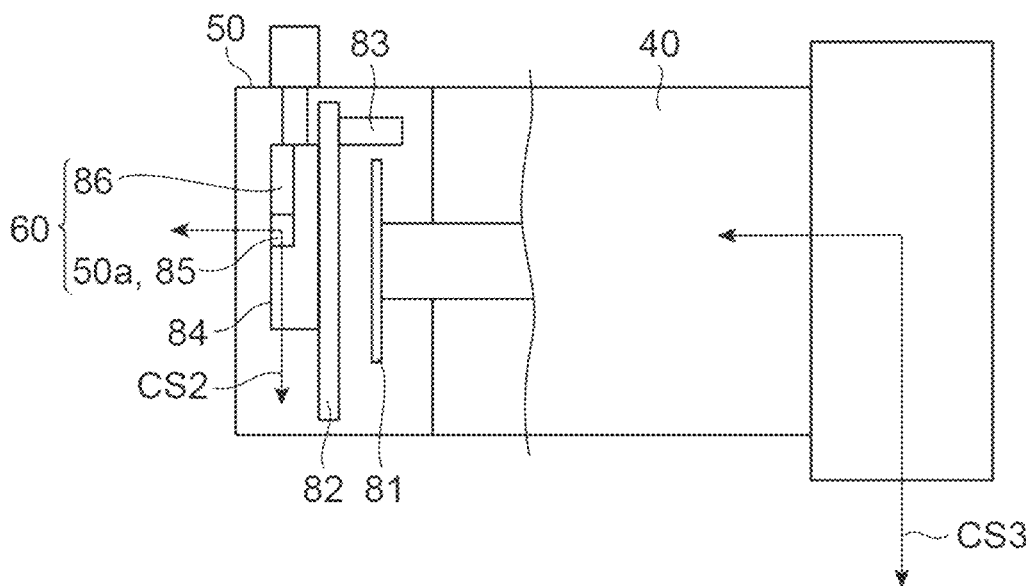
FIG. 2 is a schematic diagram illustrating an example configuration of an encoder.

Referring to FIG. 2, an example structure of the encoders 51, 52, 53, 54, 55, 56 is illustrated in more detail. Since the illustrated contents are common in the encoders 51, 52, 53, 54, 55, 56, they are referred to as an encoder 50 without distinction. The motors 41, 42, 43, 44, 45, 46 to which the encoders 51, 52, 53, 54, 55, 56 are respectively fixed are also referred to as a motor 40 without distinction. The sensors 61, 62, 63, 64, 65, 66 built into the encoders 51, 52, 53, 54, 55, 56 respectively are also referred to as a sensor 60 without distinction.

As illustrated in FIG. 2, the encoder 50 includes a disk 81 and a circuit board 82. The disk 81 is fixed to the rotor of the motor 40 and rotates with the rotor. The circuit board 82 includes a pulse generation unit 83 and an integrated circuit 84. The pulse generation unit 83 generates a pulse signal corresponding to the rotation of the disk 81. The integrated circuit 84 calculates the rotational angle of the motor 40. For example, the integrated circuit 84 counts the pulse signals generated by the pulse generation unit 83 and calculates the rotational angle of the motor 40.

The sensor 60 may include a micro electro mechanical system (MEMS) device formed on the integrated circuit 84. The MEMS device is a device that integrates an electrical circuit and a mechanical structure into a single semiconducting substrate.

For example, the sensor 60 includes a sensing unit 85 and an Analog-to-Digital (AD) conversion circuit 86. The sensing unit 85 is a MEMS device and is formed at a sensing position 50a within the integrated circuit 84. The sensing unit 85 generates an analog electrical signal indicating the acceleration of the sensing position 50a. The AD conversion circuit 86 is formed in the integrated circuit 84 together with the sensing unit 85 and converts the analog electrical signal generated by the sensing unit 85 into a digital signal.

For example, the sensing unit 85 generates an electrical signal indicating the acceleration of the sensing position 50a in a sensor coordinate system CS2 fixed to the sensing position 50a. For example, the sensor coordinate system CS2 is a three-dimensional orthogonal coordinate system and has three coordinate axes orthogonal to each other. The sensing unit 85 generates three analog electrical signals that indicate the acceleration of the sensing position 50a as a vector in the sensor coordinate system CS2. The AD conversion circuit 86 converts the three electrical signals generated by the sensing unit 85 into three digital signals, respectively.

The controller 100 operates the robotic arm 10 in accordance with an operation program prepared in advance. As described above, the robotic arm 10 includes the sensors 61, 62, 63, 64, 65, 66 having a fixed relative position with respect to the motors 41, 42, 43, 44, 45, 46, respectively. With the sensor in which the relative position is fixed to the motor, wiring to the sensor can be simplified by supplying power to the sensor using a power supply system to the motor, acquiring information from the sensor using a communication system for motor control, and the like.

However, when the relative position of the first sensor with respect to the first motor is unknown, it is also unknown which direction the first sensor information acquired from the first sensor is related to, and thus it is difficult to utilize the first sensor information.

In contrast, the controller 100 includes a memory configured to store first position information indicating a relative position of the first sensor with respect to a first reference position related to the first motor. Since the first position information is stored in the memory, it is readily specified which direction the first sensor information is related to, based on the first position information.

Figure 3:
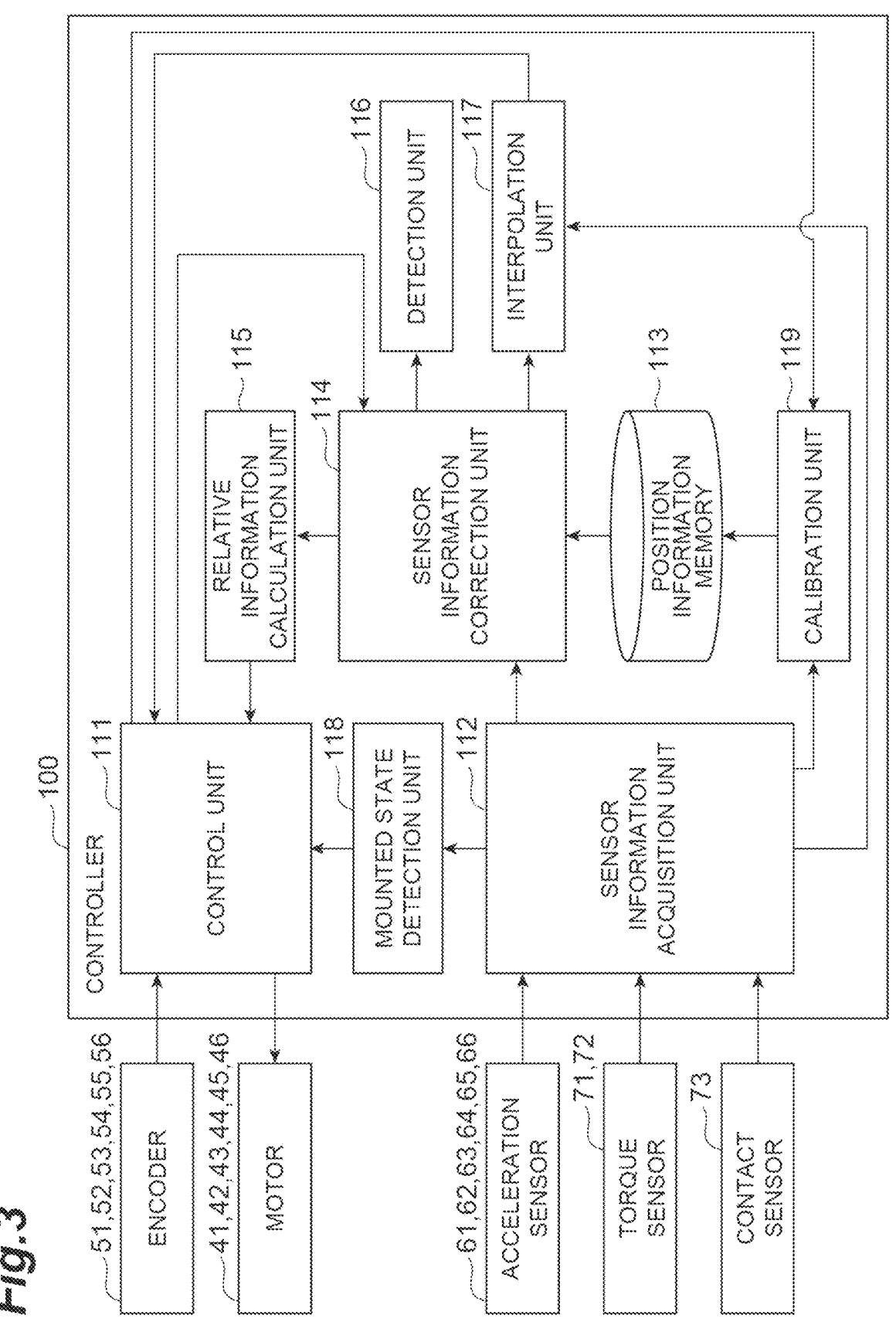
FIG. 3 is a block diagram illustrating an example configuration of a controller.

For example, as illustrated in FIG. 3, the controller 100 includes a control unit 111, a sensor information acquisition unit 112, a position information memory 113, and a sensor information correction unit 114 as functional constituent elements (hereinafter referred to as "functional blocks").

The control unit 111 operates the robotic arm 10 in accordance with an operation program prepared in advance. The operation program includes a plurality of operation commands in time series. Each of the plurality of operation commands includes, for example, a target position and a target posture of the tip portion 15. Each of the plurality of operation commands may further include a target position and a target speed for movement to a target posture. For example, the control unit 111 repeatedly executes the following processing in a predetermined control period. —Calculating the target position and target posture of the tip portion 15 for each control period based on the operation command. —Calculating the target angle of the motors 41, 42, 43, 44, 45, 46 by inverse kinematics calculation based on the target position and the target posture of the tip portion 15 and the model information of the robotic arm 10 for each control period. —Acquiring the current angle of the motors 41, 42, 43, 44, 45, 46 detected by the encoders 51, 52, 53,

54, 55, 56. —Driving the motors 41, 42, 43, 44, 45, 46 so that the current angle follows the target angle.

The sensor information acquisition unit 112 acquires first sensor information from the first sensor. The sensor information acquisition unit 112 may further acquire second sensor information from the second sensor. For example, the sensor information acquisition unit 112 acquires sensor information from the sensors 61, 62, 63, 64, 65, 66. For example, the sensor information acquisition unit 112 acquires sensor information indicating a detection result of acceleration of the sensing position 51a from the sensor 61, acquires sensor information indicating a detection result of acceleration of the sensing position 52a from the sensor 62, acquires sensor information indicating a detection result of acceleration of the sensing position 53a from the sensor 63, acquires sensor information indicating a detection result of acceleration of the sensing position 54a from the sensor 64, acquires sensor information indicating a detection result of acceleration of the sensing position 55a from the sensor 65, and acquires sensor information indicating a detection result of acceleration of the sensing position 56a from the sensor 66.

The sensor information acquisition unit 112 may further acquire other sensor information from other sensors. For example, the sensor information acquisition unit 112 further acquires other sensor information from the torque sensors 71, 72 and the contact sensor 73. For example, the sensor information acquisition unit 112 acquires sensor information indicating a detection result of torque from the torque sensors 71, 72, and acquires sensor information indicating a detection result of contact from the contact sensor 73.

The position information memory 113 stores first position information indicating a relative position of the first sensor with respect to a first reference position related to the first motor. The position information memory 113 may further store second position information indicating a relative position of the second sensor with respect to a second reference position related to the second motor. For example, the position information memory 113 stores position information indicating a relative position of the sensor 61 with respect to a reference position related to the motor 41, position information indicating a relative position of the sensor 62 with respect to a reference position related to the motor 42, position information indicating a relative position of the sensor 63 with respect to a reference position related to the motor 43, position information indicating a relative position of the sensor 64 with respect to a reference position related to the motor 44, position information indicating a relative position of the sensor 65 with respect to a reference position related to the motor 45, and position information indicating a relative position of the sensor 66 with respect to a reference position related to the motor 46. The reference position related to the motor 41 is a position whose relative position is fixed with respect to the motor 41. The reference position related to the motor 41 may be located inside the motor 41 or outside the motor 41. For example, the reference position related to the motor 41 may be located at a site fixed to the motor 41 (for example, the robot base 11). The same applies to the reference positions related to the other motors. Hereinafter, the contents of the position information will be described as the position information indicating the relative position of the sensor 60 with respect to the reference position related to the motor 40, without distinguishing each position information.

For example, the position information indicates the relative position of the sensing position 50a of the sensor 60 with respect to the reference position related to the motor 40 as coordinates in a motor coordinate system CS3 fixed to the motor 40. Each piece of position information may further indicate a relative posture of the sensor 60 with respect to the motor 40. For example, each piece of position information may further indicate a relative posture of the sensor coordinate system CS2 with respect to the motor coordinate system CS3.

The motor coordinate system CS3 may be fixed to at least the motor 40, and the origin (reference position) of the motor coordinate system CS3 may be located outside the motor 40. For example, the origin of the motor coordinate system CS3 may be located at a link to which the motor 40 is fixed. For example, regarding the origin of the motor coordinate system CS3, the origin of the motor coordinate system CS3 of the motor 41 may be located in the pivoting portion 17, the origin of the motor coordinate system CS3 of the motor 42 may be located in the pivoting portion 17, the origin of the motor coordinate system CS3 of the motor 43 may be located in the arm 12, the origin of the motor coordinate system CS3 of the motor 44 may be located in the arm base 18, and the origin of the motor coordinate system CS3 of the motors 45, 46 may be located in the arm end 19.

The sensor information correction unit 114 corrects the first sensor information acquired from the first sensor based on the first position information and information related to the state of the first link. The sensor information correction unit 114 may correct the first sensor information acquired from the first sensor based on the first position information, the information related to the state of the first link, and information related to the state of the second link. The sensor information correction unit 114 may correct the second sensor information acquired from the second sensor based on the second position information. Examples of the information related to the state of the link include a rotational angle, a rotational angular velocity, a rotational angular acceleration, a rotational angle jerk, a length of the link, a relative angle between the links, and a distance between the links of the link.

For example, the sensor information correction unit 114 corrects the sensor information acquired from the sensor 62 based on the information related to the state of the pivoting portion 17. For example, the sensor information correction unit 114 may correct the sensor information acquired from the sensor 62 to information independent of the posture of the sensor 62, based on the rotational angle of the pivoting portion 17. The information independent of the posture of the sensor 62 means information from which the influence of the posture of the sensor 62 is excluded. Hereinafter, the same applies to the description of the sensors 63, 64, 65, 66. For example, the sensor information correction unit 114 corrects sensor information indicated by a vector in the sensor coordinate system CS2 to sensor information indicated by a vector in a robot coordinate system CS1 based on the model information of the robotic arm 10, the position information of the sensor 62, and the rotational angle of the pivoting portion 17 described above.

The sensor information correction unit 114 may correct the sensor information acquired from the sensor 62 to information independent of the rotational acceleration of the pivoting portion 17 based on the position information of the sensor 62 and the rotational acceleration of the pivoting portion 17. The information independent of the rotational acceleration of the pivoting portion 17 means information from which the influence of the rotational acceleration of the pivoting portion 17 is excluded. For example, based on the model information of the robotic arm 10, the rotational acceleration of the pivoting portion 17, and the position information of the sensor 62, the sensor information correction unit 114 calculates the acceleration that occurs at the sensing position 52a due to the rotational acceleration of the pivoting portion 17, and excludes the calculated acceleration from the acceleration detected by the sensor 62. With the corrected sensor information, acceleration caused by a factor different from the rotational acceleration of the pivoting portion 17 may be detected. Examples of such a factor include deflection of the pivoting portion 17, rattling of the pivoting portion 17 with respect to the base 16, and rattling of the motor 42 with respect to the pivoting portion 17.

The sensor information correction unit 114 may correct the sensor information acquired from the sensor 62 to information independent of the rotational speed of the pivoting portion 17 based on the position information of the sensor 62 and the rotational speed of the pivoting portion 17. The information independent of the rotational speed of the pivoting portion 17 means information from which the influence of the rotational speed of the pivoting portion 17 is excluded. For example, based on the model information of the robotic arm 10, the rotational speed of the pivoting portion 17, and the position information of the sensor 62, the sensor information correction unit 114 calculates the acceleration that occurs at the sensing position 52a due to the rotational speed of the pivoting portion 17, and excludes the calculated acceleration from the acceleration detected by the sensor 62. With the corrected sensor information, acceleration caused by a factor different from the rotational speed of the pivoting portion 17 may be detected. Specific examples of such a factor include deflection of the pivoting portion 17, rattling of the pivoting portion 17 with respect to the base 16, and rattling of the motor 42 with respect to the pivoting portion 17.

The sensor information correction unit 114 may correct the sensor information acquired from the sensor 62 to information independent of the rotational acceleration and the rotational speed of the pivoting portion 17 based on the position information of the sensor 62 and the rotational acceleration and the rotational speed of the pivoting portion 17. The information independent of the rotational acceleration and the rotational speed of the pivoting portion 17 means information from which the influence of the rotational acceleration and the rotational speed of the pivoting portion 17 is excluded. For example, based on the model information of the robotic arm 10, the rotational acceleration and the rotational speed of the pivoting portion 17, and the position information of the sensor 62, the sensor information correction unit 114 calculates the acceleration that occurs at the sensing position 52a due to the rotational acceleration and the rotational speed of the pivoting portion 17, and excludes the calculated acceleration from the acceleration detected by the sensor 62. With the corrected sensor information, acceleration caused by a factor different from the rotational acceleration and the rotational speed of the pivoting portion 17 may be detected. Examples of such a factor include deflection of the pivoting portion 17, rattling of the pivoting portion 17 with respect to the base 16, and rattling of the motor 42 with respect to the pivoting portion 17.

The sensor information correction unit 114 corrects the sensor information acquired from the sensor 63 based on the information related to the state of the arm 12 and the information related to the state of the pivoting portion 17. For example, the sensor information correction unit 114 may correct the sensor information acquired from the sensor 63 to information independent of the posture of the sensor 63, based on the rotational angle of the arm 12 and the rotational angle of the pivoting portion 17. For example, the sensor information correction unit 114 corrects sensor information indicated by a vector in the sensor coordinate system CS2 to sensor information indicated by a vector in the robot coordinate system CS1 based on the model information of the robotic arm 10, the position information of the sensor 63, the rotational angle of the arm 12, and the rotational angle of the pivoting portion 17. Thus, the sensor information acquired from the sensor 62 and the sensor information acquired from the sensor 63 are corrected to information in a common coordinate system.

The sensor information correction unit 114 may correct the sensor information acquired from the sensor 63 to information independent of gravity. The information independent of gravity means information from which the influence of gravity is excluded. For example, the sensor information correction unit 114 corrects the sensor information acquired from the sensor 63 to sensor information indicated by a vector in the robot coordinate system CS1 as described above, and excludes a gravitational acceleration vector in the robot coordinate system CS1 from the corrected sensor information.

The sensor information correction unit 114 may correct the sensor information acquired from the sensor 63 to information independent of the rotational acceleration of the arm 12 and the rotational acceleration of the pivoting portion 17, based on the position information of the sensor 63, the rotational acceleration of the arm 12, and the rotational acceleration of the pivoting portion 17. The information independent of the rotational acceleration of the arm 12 and the rotational acceleration of the pivoting portion 17 means information from which the influence of the rotational acceleration of the arm 12 and the rotational acceleration of the pivoting portion 17 is excluded. For example, based on the model information of the robotic arm 10, the rotational acceleration of the arm 12, the rotational acceleration of the pivoting portion 17, and the position information of the sensor 63, the sensor information correction unit 114 calculates the acceleration that occurs at the sensing position 53a due to the rotational acceleration of the arm 12 and the rotational acceleration of the pivoting portion 17, and excludes the calculated acceleration from the acceleration detected by the sensor 63. With the corrected sensor information, acceleration caused by a factor different from the rotational acceleration of the arm 12 and the rotational acceleration of the pivoting portion 17 can be detected. Examples of such a factor include deflection in the pivoting portion 17, rattling of the pivoting portion 17 with respect to the base 16, deflection in the arm 12, rattling of the arm 12 with respect to the pivoting portion 17, and rattling of the motor 43 with respect to the arm 12.

The sensor information correction unit 114 may correct the sensor information acquired from the sensor 63 to information independent of the rotational speed of the arm 12 and the rotational speed of the pivoting portion 17, based on the position information of the sensor 63, the rotational speed of the arm 12, and the rotational speed of the pivoting portion 17. The information independent of the rotational speed of the arm 12 and the rotational speed of the pivoting portion 17 means information from which the influence of the rotational speed of the arm 12 and the rotational speed of the pivoting portion 17 is excluded. For example, based on the model information of the robotic arm 10, the rotational speed of the arm 12, the rotational speed of the pivoting portion 17, and the position information of the sensor 63, the sensor information correction unit 114 calculates the acceleration that occurs at the sensing position 53a due to the rotational speed of the arm 12 and the rotational speed of the pivoting portion 17, and excludes the calculated acceleration from the acceleration detected by the sensor 63. With the corrected sensor information, acceleration caused by a factor different from the rotational speed of the arm 12 and the rotational speed of the pivoting portion 17 can be detected. Examples of such a factor include deflection in the pivoting portion 17, rattling of the pivoting portion 17 with respect to the base 16, deflection in the arm 12, rattling of the arm 12 with respect to the pivoting portion 17, and rattling of the motor 43 with respect to the arm 12.

The sensor information correction unit 114 may correct the sensor information acquired from the sensor 63 to information independent of the rotational acceleration and the rotational speed of the arm 12 and the rotational acceleration and the rotational speed of the pivoting portion 17, based on the position information of the sensor 63, the rotational acceleration and the rotational speed of the arm 12, and the rotational acceleration and the rotational speed of the pivoting portion 17. The information independent of the rotational acceleration and the rotational speed of the arm 12 and the rotational acceleration and the rotational speed of the pivoting portion 17 means information from which the influence of the rotational acceleration and the rotational speed of the arm 12 and the influence of the rotational acceleration and the rotational speed of the pivoting portion 17 are excluded. For example, based on the model information of the robotic arm 10, the rotational acceleration and the rotational speed of the arm 12, the rotational acceleration and the rotational speed of the pivoting portion 17, and the position information of the sensor 63, the sensor information correction unit 114 calculates the acceleration occurring at the sensing position 53a due to the rotational acceleration and the rotational speed of the arm 12 and the rotational acceleration and the rotational speed of the pivoting portion 17, and excludes the calculated acceleration from the acceleration detected by the sensor 63. With the corrected sensor information, acceleration caused by a factor different from the rotational acceleration and the rotational speed of the arm 12 and the rotational acceleration and the rotational speed of the pivoting portion 17 may be detected. Examples of such a factor include deflection in the pivoting portion 17, rattling of the pivoting portion 17 with respect to the base 16, deflection in the arm 12, rattling of the arm 12 with respect to the pivoting portion 17, and rattling of the motor 43 with respect to the arm 12.

The sensor information correction unit 114 corrects the sensor information acquired from the sensor 64 based on the information related to the state of the arm base 18, the information related to the state of the arm 12, and the information related to the state of the pivoting portion 17. For example, the sensor information correction unit 114 may correct the sensor information acquired from the sensor 64 to information independent of the posture of the sensor 64 based on the rotational angle of the arm base 18, the rotational angle of the arm 12, and the rotational angle of the pivoting portion 17. For example, the sensor information correction unit 114 corrects sensor information indicated by a vector in the sensor coordinate system CS2 to sensor information indicated by a vector in the robot coordinate system CS1 based on the model information of the robotic arm 10, position information of the sensor 64, a rotational angle of the arm base 18, a rotational angle of the arm 12, and a rotational angle of the pivoting portion 17. Thus, the sensor information acquired from the sensor 62, the sensor information acquired from the sensor 63, and the sensor information acquired from the sensor 64 are corrected to information in a common coordinate system.

The sensor information correction unit 114 may correct the sensor information acquired from the sensor 64 to information independent of the gravitational acceleration. The information independent of the gravitational acceleration includes information independent of gravity (mass× gravitational acceleration). For example, the sensor information correction unit 114 corrects sensor information acquired from the sensor 64 to sensor information indicated by a vector in the robot coordinate system CS1 as described above, and excludes a gravitational acceleration vector in the robot coordinate system CS1 from the corrected sensor information.

The sensor information correction unit 114 may correct the sensor information acquired from the sensor 64 to information independent of the rotational acceleration of the arm base 18, the rotational acceleration of the arm 12, and the rotational acceleration of the pivoting portion 17, based on the position information of the sensor 64, the rotational acceleration of the arm base 18, the rotational acceleration of the arm 12, and the rotational acceleration of the pivoting portion 17. The information independent of the rotational acceleration of the arm base 18, the rotational acceleration of the arm 12, and the rotational acceleration of the pivoting portion 17 means information from which the influence of the rotational acceleration of the arm base 18, the rotational acceleration of the arm 12, and the rotational acceleration of the pivoting portion 17 is excluded. For example, based on the model information of the robotic arm 10, the rotational acceleration of the arm base 18, the rotational acceleration of the arm 12, the rotational acceleration of the pivoting portion 17, and the position information of the sensor 64, the sensor information correction unit 114 calculates the acceleration generated at the sensing position 54a due to the rotational acceleration of the arm base 18, the rotational acceleration of the arm 12, and the rotational acceleration of the pivoting portion 17, and excludes the calculated acceleration from the acceleration detected by the sensor 64. With the corrected sensor information, acceleration caused by a factor different from the rotational acceleration of the arm base 18, the rotational acceleration of the arm 12, and the rotational acceleration of the pivoting portion 17 may be detected. Examples of such a factor include deflection of the pivoting portion 17, rattling of the pivoting portion 17 with respect to the base 16, deflection of the arm 12, rattling of the arm 12 with respect to the pivoting portion 17, deflection of the arm base 18, rattling of the arm base 18 with respect to the arm 12, and rattling of the motor 44 with respect to the arm base 18.

The sensor information correction unit 114 may correct the sensor information acquired from the sensor 64 to information independent of the rotational speed of the arm base 18, the rotational speed of the arm 12, and the rotational speed of the pivoting portion 17, based on the position information of the sensor 64, the rotational speed of the arm base 18, the rotational speed of the arm 12, and the rotational speed of the pivoting portion 17. The information independent of the rotational speed of the arm base 18, the rotational speed of the arm 12, and the rotational speed of the pivoting portion 17 means information from which the influence of the rotational speed of the arm base 18, the rotational speed of the arm 12, and the rotational speed of the pivoting portion 17 is excluded. For example, based on the model information of the robotic arm 10, the rotational speed of the arm base 18, the rotational speed of the arm 12, the rotational speed of the pivoting portion 17, and the position information of the sensor 64, the sensor information correction unit 114 calculates the acceleration that occurs at the sensing position 54*a* due to the rotational speed of the arm base 18, the rotational speed of the arm 12, and the rotational speed of the pivoting portion 17, and excludes the calculated acceleration from the acceleration detected by the sensor 64. With the corrected sensor information, acceleration caused by a factor other than the rotational speed of the arm base 18, the rotational speed of the arm 12, and the rotational speed of the pivoting portion 17 may be detected. Examples of such a factor include deflection of the pivoting portion 17, rattling of the pivoting portion 17 with respect to the base 16, deflection of the arm 12, rattling of the arm 12 with respect to the pivoting portion 17, deflection of the arm base 18, rattling of the arm base 18 with respect to the arm 12, and rattling of the motor 44 with respect to the arm base 18.

The sensor information correction unit 114 may correct the sensor information acquired from the sensor 64 to information independent of the rotational acceleration and the rotational speed of the arm base 18, the rotational acceleration and the rotational speed of the arm 12, and the rotational acceleration and the rotational speed of the pivoting portion 17, based on the position information of the sensor 64, the rotational acceleration and the rotational speed of the arm base 18, the rotational acceleration and the rotational speed of the arm 12, and the rotational acceleration and the rotational speed of the pivoting portion 17. The information independent of the rotational acceleration and the rotational speed of the arm base 18, the rotational acceleration and the rotational speed of the arm 12, and the rotational acceleration and the rotational speed of the pivoting portion 17 means information from which the influence of the rotational acceleration and the rotational speed of the arm base 18, the influence of the rotational acceleration and the rotational speed of the arm 12, and the influence of the rotational acceleration and the rotational speed of the pivoting portion 17 are excluded. For example, based on the model information of the robotic arm 10, the rotational acceleration and the rotational speed of the arm base 18, the rotational acceleration and the rotational speed of the arm 12, the rotational acceleration and the rotational speed of the pivoting portion 17, and the position information of the sensor 64, the sensor information correction unit 114 calculates the acceleration generated at the sensing position 54*a* due to the rotational acceleration and the rotational speed of the arm base 18, the rotational acceleration and the rotational speed of the arm 12, and the rotational acceleration and the rotational speed of the pivoting portion 17, and excludes the calculated acceleration from the acceleration detected by the sensor 64. With the corrected sensor information, acceleration caused by a factor different from the rotational acceleration and the rotational speed of the arm base 18, the rotational acceleration and the rotational speed of the arm 12, and the rotational acceleration and the rotational speed of the pivoting portion 17 may be detected. Examples of such a factor include deflection of the pivoting portion 17, rattling of the pivoting portion 17 with respect to the base 16, deflection of the arm 12, rattling of the arm 12 with respect to the pivoting portion 17, deflection of the arm base 18, rattling of the arm base 18 with respect to the arm 12, and rattling of the motor 44 with respect to the arm base 18.

The sensor information correction unit 114 corrects the sensor information acquired from the sensors 65, 66 based on the information related to the state of the arm end 19, the information related to the state of the arm base 18, the information related to the state of the arm 12, and the information related to the state of the pivoting portion 17. For example, the sensor information correction unit 114 may correct the sensor information acquired from the sensors 65, 66 to information independent of the posture of the sensors 65, 66 based on the rotational angle of the arm end 19, the rotational angle of the arm base 18, the rotational angle of the arm 12, and the rotational angle of the pivoting portion 17. For example, the sensor information correction unit 114 corrects sensor information indicated by a vector in the sensor coordinate system CS2 to sensor information indicated by a vector in the robot coordinate system CS1 based on model information of the robotic arm 10, position information of the sensors 65, 66, the rotational angle of the arm end 19, the rotational angle of the arm base 18, the rotational angle of the arm 12, and the rotational angle of the pivoting portion 17. Thus, the sensor information acquired from the sensor 62, the sensor information acquired from the sensor 63, the sensor information acquired from the sensor 64, and the sensor information acquired from the sensors 65, 66 are corrected to information in a common coordinate system.

The sensor information correction unit 114 may correct the sensor information acquired from the sensors 65, 66 to information independent of gravity. For example, the sensor information correction unit 114 corrects sensor information acquired from the sensors 65, 66 to sensor information represented by a vector in the robot coordinate system CS1 as described above, and excludes a gravitational acceleration vector in the robot coordinate system CS1 from the corrected sensor information.

The sensor information correction unit 114 may correct the sensor information acquired from the sensors 65, 66 to information independent of the rotational acceleration of the arm end 19, the rotational acceleration of the arm base 18, the rotational acceleration of the arm 12, and the rotational acceleration of the pivoting portion 17, based on the position information of the sensors 65, 66, the rotational acceleration of the arm end 19, the rotational acceleration of the arm base 18, the rotational acceleration of the arm 12, and the rotational acceleration of the pivoting portion 17. The information independent of the rotational acceleration of the arm end 19, the rotational acceleration of the arm base 18, the rotational acceleration of the arm 12, and the rotational acceleration of the pivoting portion 17 means information from which the influence of the rotational acceleration of the arm end 19, the rotational acceleration of the arm base 18, the rotational acceleration of the arm 12, and the rotational acceleration of the pivoting portion 17 is excluded. For example, based on the model information of the robotic arm 10, the rotational acceleration of the arm end 19, the rotational acceleration of the arm base 18, the rotational acceleration of the arm 12, the rotational acceleration of the pivoting portion 17, and the position information of the sensors 65, 66, the sensor information correction unit 114 calculates the acceleration generated at the sensing position 55*a* due to the rotational acceleration of the arm end 19, the rotational acceleration of the arm base 18, the rotational acceleration of the arm 12, and the rotational acceleration of the pivoting portion 17, and excludes the calculated acceleration from the acceleration detected by the sensors 65, 66. With the corrected sensor information, acceleration caused by a factor different from the rotational acceleration of the arm end 19, the rotational acceleration of the arm base 18, the rotational acceleration of the arm 12, and the rotational acceleration of the pivoting portion 17 may be detected. Examples of such a factor include deflection of the pivoting portion 17, rattling of the pivoting portion 17 with respect to the base 16, deflection of the arm 12, rattling of the arm 12 with respect to the pivoting portion 17, deflection of the arm base 18, rattling of the arm base 18 with respect to the arm 12, deflection of the arm end 19, rattling of the arm end 19 with respect to the arm base 18, and rattling of the motors 45, 46 with respect to the arm end 19.

The sensor information correction unit 114 may correct the sensor information acquired from the sensors 65, 66 to information independent of the rotational speed of the arm end 19, the rotational speed of the arm base 18, the rotational speed of the arm 12, and the rotational speed of the pivoting portion 17, based on the position information of the sensors 65, 66, the rotational speed of the arm end 19, the rotational speed of the arm base 18, the rotational speed of the arm 12, and the rotational speed of the pivoting portion 17. The information independent of the rotational speed of the arm end 19, the rotational speed of the arm base 18, the rotational speed of the arm 12, and the rotational speed of the pivoting portion 17 means information from which the influence of the rotational speed of the arm end 19, the rotational speed of the arm base 18, the rotational speed of the arm 12, and the rotational speed of the pivoting portion 17 is excluded. For example, based on the model information of the robotic arm 10, the rotational speed of the arm end 19, the rotational speed of the arm base 18, the rotational speed of the arm 12, the rotational speed of the pivoting portion 17, and the position information of the sensors 65, 66, the sensor information correction unit 114 calculates the acceleration that occurs at the sensing position 55a due to the rotational speed of the arm end 19, the rotational speed of the arm base 18, the rotational speed of the arm 12, and the rotational speed of the pivoting portion 17, and excludes the calculated acceleration from the acceleration detected by the sensors 65, 66. With the corrected sensor information, acceleration caused by a factor other than the rotational speed of the arm end 19, the rotational speed of the arm base 18, the rotational speed of the arm 12, and the rotational speed of the pivoting portion 17 may be detected. Examples of such a factor include deflection of the pivoting portion 17, rattling of the pivoting portion 17 with respect to the base 16, deflection of the arm 12, rattling of the arm 12 with respect to the pivoting portion 17, deflection of the arm base 18, rattling of the arm base 18 with respect to the arm 12, deflection of the arm end 19, rattling of the arm end 19 with respect to the arm base 18, and rattling of the motors 45, 46 with respect to the arm end 19.

The sensor information correction unit 114 may correct the sensor information acquired from the sensors 65, 66 to information independent of the rotational acceleration and the rotational speed of the arm end 19, the rotational acceleration and the rotational speed of the arm base 18, the rotational acceleration and the rotational speed of the arm 12, and the rotational acceleration and the rotational speed of the pivoting portion 17, based on the position information of the sensors 65, 66, the rotational acceleration and the rotational speed of the arm end 19, the rotational acceleration and the rotational speed of the arm base 18, the rotational acceleration and the rotational speed of the arm 12, and the rotational acceleration and the rotational speed of the pivoting portion 17. The information independent of the rotational acceleration and the rotational speed of the arm end 19, the rotational acceleration and the rotational speed of the arm base 18, the rotational acceleration and the rotational speed of the arm 12, and the rotational acceleration and the rotational speed of the pivoting portion 17 means information from which the influence of the rotational acceleration and the rotational speed of the arm base 18, the influence of the rotational acceleration and the rotational speed of the arm 12, and the influence of the rotational acceleration and the rotational speed of the pivoting portion 17 are excluded. For example, based on the model information of the robotic arm 10, the rotational acceleration and rotational speed of the arm end 19, the rotational acceleration and rotational speed of the arm base 18, the rotational acceleration and rotational speed of the arm 12, the rotational acceleration and rotational speed of the pivoting portion 17, and the position information of the sensors 65, 66, the sensor information correction unit 114 calculates the acceleration generated at the sensing position 55a due to the rotational acceleration and rotational speed of the arm end 19, the rotational acceleration and rotational speed of the arm base 18, the rotational acceleration and rotational speed of the arm 12, and the rotational acceleration and rotational speed of the pivoting portion 17, and excludes the calculated acceleration from the acceleration detected by the sensors 65, 66. With the corrected sensor information, acceleration caused by a factor different from the rotational acceleration and rotational speed of the arm end 19, the rotational acceleration and rotational speed of the arm base 18, the rotational acceleration and rotational speed of the arm 12, and the rotational acceleration and rotational speed of the pivoting portion 17 may be detected. Examples of such a factor include deflection of the pivoting portion 17, rattling of the pivoting portion 17 with respect to the base 16, deflection of the arm 12, rattling of the arm 12 with respect to the pivoting portion 17, deflection of the arm base 18, rattling of the arm base 18 with respect to the arm 12, deflection of the arm end 19, rattling of the arm end 19 with respect to the arm base 18, and rattling of the motors 45, 46 with respect to the arm end 19.

For example, the sensor information correction unit 114 may correct the sensor information acquired from the sensor 61 based on the information related to the state of the pivoting portion 17. For example, the sensor information correction unit 114 may correct the sensor information acquired from the sensor 61 to information independent of the posture of the sensor 61, based on the rotational angle of the pivoting portion 17. The information independent of the posture of the sensor 61 means information from which the influence of the posture of the sensor 61 is excluded. For example, the sensor information correction unit 114 corrects sensor information indicated by a vector in the sensor coordinate system CS2 to sensor information indicated by a vector in the robot coordinate system CS1 based on the model information of the robotic arm 10, the position information of the sensor 61, and the rotational angle of the pivoting portion 17 described above.

The controller 100 may further include a relative information calculation unit 115. The relative information calculation unit 115 calculates, based on first sensor information corrected by the sensor information correction unit 114 and second sensor information corrected by the sensor information correction unit 114, relative sensor information in which the component corresponding to the second sensor information is excluded from the first sensor information. For example, the relative information calculation unit 115 calculates the relative sensor information in which the component corresponding to the sensor information of the sensor 62 is excluded from the sensor information of the sensor 63 based on the sensor information of the sensor 63 corrected by the sensor information correction unit 114 and the corrected sensor information of the sensor 62. For example, the relative information calculation unit 115 calculates, as the relative sensor information, the relative acceleration in which the acceleration indicated by the corrected sensor information of the sensor 62 is excluded from the acceleration indicated by the corrected sensor information of the sensor 63. For example, the relative information calculation unit 115 calculates the relative acceleration of the sensing position 53*a* in which the acceleration of the sensing position 52*a* indicated by a vector in the robot coordinate system CS1 is excluded from the acceleration of the sensing position 53*a* indicated by a vector in the robot coordinate system CS1.

The "second motor" to which the relative position of the "second sensor" that detects the "second sensor information" in the calculation of the relative sensor information is fixed may not be a motor that rotates the "first link", and may be a motor that rotates at least a site that is a part of the robotic arm 10. For example, the relative information calculation unit 115 may calculate the relative sensor information in which a component corresponding to the sensor information of the sensor 61 is excluded from the sensor information of the sensor 63 based on the sensor information of the sensor 63 corrected by the sensor information correction unit 114 and the corrected sensor information of the sensor 61. For example, the relative information calculation unit 115 may calculate, as the relative sensor information, the relative acceleration in which the acceleration indicated by the corrected sensor information of the sensor 61 is excluded from the acceleration indicated by the corrected sensor information of the sensor 63. For example, the relative information calculation unit 115 may calculate the relative acceleration of the sensing position 53*a* in which the acceleration of the sensing position 51*a* indicated by a vector in the robot coordinate system CS1 is excluded from the acceleration of the sensing position 53*a* indicated by a vector in the robot coordinate system CS1.

The relative information calculation unit 115 may calculate a relative vibration in which a vibration component corresponding to the vibration indicated by the corrected sensor information of the sensor 62 is excluded from the vibration indicated by the corrected sensor information of the sensor 63. For example, the relative information calculation unit 115 detects the vibration of the sensing position 52*a* in the robot coordinate system CS1 based on the acceleration indicated by the corrected sensor information of the sensor 62, and detects the vibration of the sensing position 53*a* in the robot coordinate system CS1 based on the acceleration indicated by the corrected sensor information of the sensor 63. The relative information calculation unit 115 calculates the relative vibration of the sensing position 53*a* in which the vibration of the sensing position 52*a* in the robot coordinate system CS1 is excluded from the vibration of the sensing position 53*a* in the robot coordinate system CS1. The relative information calculation unit 115 may calculate the relative vibration of the sensing position 53*a* based on the relative acceleration.

The relative information calculation unit 115 may calculate a main relative vibration of the sensing position 53*a* along the movement direction of the motor 43 by the motor 42 as the relative vibration. For example, the relative information calculation unit 115 calculates a relative vibration indicated by a vector in the robot coordinate system CS1, and calculates a component along the movement direction of the motor 43 by the motor 42 from the calculated relative vibration as the main relative vibration of the sensing position 53*a*. The relative information calculation unit 115 may calculate, as the relative vibration, a sub relative vibration of the sensing position 53*a* along a direction intersecting (for example, orthogonal to) the movement direction of the motor 43 by the motor 42. For example, the relative information calculation unit 115 calculates the relative vibration indicated by a vector in the robot coordinate system CS1, and calculates a component along a direction intersecting the movement direction of the motor 43 by the motor 42 from the calculated relative vibration as the sub relative vibration of the sensing position 53*a*. The relative information calculation unit 115 may calculate both the main relative vibration and the sub relative vibration.

The control unit 111 may control the robotic arm 10 so that the relative vibration of the sensing position 53*a* decreases. For example, the control unit 111 controls the motor 42 so that the main relative vibration of the sensing position 53*a* decreases. For example, the control unit 111 controls the motor 42 so as to generate a torque that cancels out the main relative vibration of the sensing position 53*a*.

The control unit 111 may control a motor other than the motor 42 (for example, the motor 41) so that the sub relative vibration of the sensing position 53*a* decreases. For example, the control unit 111 controls the motor 41 to generate a torque that cancels out the sub relative vibration of the sensing position 53*a*.

Similarly, the relative information calculation unit 115 may calculate relative sensor information in which the component corresponding to the sensor information of the sensor 63 is excluded from the sensor information of the sensor 64 based on the sensor information of the sensor 64 corrected by the sensor information correction unit 114 and the corrected sensor information of the sensor 63. For example, the relative information calculation unit 115 calculates the relative acceleration in the sensing position 54*a* in which the acceleration indicated by the corrected sensor information of the sensor 63 is excluded from the acceleration indicated by the corrected sensor information of the sensor 64. The relative information calculation unit 115 may calculate the relative vibration of the sensing position 54*a* in which a vibration component corresponding to the vibration indicated by the corrected sensor information of the sensor 63 is excluded from the vibration indicated by the corrected sensor information of the sensor 64. The relative information calculation unit 115 may calculate the main relative vibration of the sensing position 54*a* along the movement direction of the motor 44 by the motor 43 as the relative vibration. The relative information calculation unit 115 may calculate, as the relative vibration, sub relative vibration of the sensing position 54*a* along a direction intersecting (for example, orthogonal to) the movement direction of the motor 44 by the motor 43. The relative information calculation unit 115 may calculate both the main relative vibration and the sub relative vibration.

The control unit 111 may control the robotic arm 10 so that the relative vibration of the sensing position 54*a* decreases. For example, the control unit 111 controls the motor 43 so that the main relative vibration of the sensing position 54*a* decreases. The control unit 111 may control a motor other than the motor 43 (for example, the motors 41, 42) so that the sub relative vibration of the sensing position 54*a* decreases.

Similarly, the relative information calculation unit 115 may calculate the relative sensor information in which the component corresponding to the sensor information of the sensor 64 is excluded from the sensor information of the sensors 65, 66 based on the sensor information of the sensors 65, 66 corrected by the sensor information correction unit 114 and the corrected sensor information of the sensor 64. For example, the relative information calculation unit 115 calculates the relative acceleration of sensing positions 55*a*, 56*a* in which the acceleration indicated by the corrected sensor information of the sensor 64 is excluded from the acceleration indicated by the corrected sensor information of the sensors 65, 66. The relative information calculation unit 115 may calculate the relative vibration of the sensing positions 55a, 56a in which a vibration component corresponding to the vibration indicated by the corrected sensor information of the sensor 64 is excluded from the vibration indicated by the corrected sensor information of the sensors 65, 66. The relative information calculation unit 115 may calculate the main relative vibration of the sensing positions 55a, 56a along the movement direction of the motors 45, 46 by the motor 44 as the relative vibration. The relative information calculation unit 115 may calculate, as the relative vibration, sub relative vibration of the sensing positions 55a, 56a along a direction intersecting (for example, orthogonal to) the movement direction of the motors 45, 46 by the motor 44. The relative information calculation unit 115 may calculate both the main relative vibration and the sub relative vibration.

The control unit 111 may control the robotic arm 10 so that the relative vibration of the sensing positions 55a, 56a is reduced. For example, the control unit 111 controls the motor 44 so that the main relative vibration of the sensing positions 55a, 56a decreases. The control unit 111 may control a motor other than the motor 44 (for example, the motors 41, 42, 43) so that the sub relative vibration of the sensing positions 55a, 56a is reduced.

The controller 100 may further include a torsion detection unit 116. The torsion detection unit 116 detects torsion of the first link based on the first sensor information corrected by the sensor information correction unit 114 and the second sensor information corrected by the sensor information correction unit 114. The torsion detection unit 116 may display the detection of the torsion on a display device 197 (described later) or the like when the torsion is detected. For example, the torsion detection unit 116 calculates the relative acceleration based on the corrected sensor information of the sensor 63 and the corrected sensor information of the sensor 62, and calculates the rotational acceleration of the arm 12 based on the relative acceleration. Hereinafter, the calculation result is referred to as "rotational acceleration of the arm 12 based on the relative acceleration". The detection unit 116 calculates the rotational acceleration of the arm 12 based on the model information of the robotic arm 10, the rotational acceleration of the motor 41, and the rotational acceleration of the motor 42. Hereinafter, the calculation result is referred to as "rotational acceleration of the arm 12 based on the model information". The torsion detection unit 116 detects the torsion of the arm 12 based on a deviation between the rotational acceleration of the arm 12 based on the relative acceleration and the rotational acceleration of the arm 12 based on the model information.

The controller 100 may further include an interpolation unit 117. The interpolation unit 117 interpolates other sensor information acquired from other sensors based on the first sensor information corrected by the sensor information correction unit 114. For example, the interpolation unit 117 interpolates the torque indicated by the sensor information of the torque sensor 71 based on the acceleration indicated by the corrected sensor information of the sensor 63. For example, the interpolation unit 117 calculates high frequency components of the torque acting on the joint 32 based on the acceleration, and adds the calculated high frequency components to the torque indicated by the sensor information of the torque sensor 71.

The interpolation unit 117 may interpolate the torque indicated by the sensor information of the torque sensor 72 based on the acceleration indicated by the corrected sensor information of the sensor 64. For example, the interpolation unit 117 calculates high frequency components of the torque acting on the joint 33 based on the acceleration, and adds the calculated high frequency components to the torque indicated by the sensor information of the torque sensor 72.

When the contact sensor 73 detects contact with the peripheral object, the interpolation unit 117 may add the acting direction of the reaction force from the peripheral object to the sensor information of the contact sensor 73 based on the acceleration indicated by the corrected sensor information of the sensors 65, 66.

The controller 100 may further include a mounted state detection unit 118. The mounted state detection unit 118 detects the mounted state of the robot base 11 based on the sensor information acquired from the sensor 61 (base sensor information). The mounted state detection unit 118 may detect the mounted state of the robot base 11 based on the sensor information of the sensor 61 corrected by the sensor information correction unit 114.

For example, the mounted state detection unit 118 may detect the mounting posture of the robot base 11 based on the sensor information of the sensor 61. For example, the mounted state detection unit 118 recognizes the acting direction of the gravitational acceleration in the robot coordinate system CS1 based on the acceleration indicated by the corrected sensor information of the sensor 61, and detects the mounting posture in the robot base 11 based on the acting direction of the gravitational acceleration. For example, the mounted state detection unit 118 detects whether the robot base 11 is placed on a floor surface so that the pivoting portion 17 is located on the base 16, whether the robot base 11 is placed on a ceiling surface so that the pivoting portion 17 is located under the base 16, or whether the robot base 11 is placed on a wall surface so that the pivoting portion 17 is located beside the base 16.

The mounted state detection unit 118 sets the control parameter based on the mounting posture of the robot base 11. For example, the mounted state detection unit 118 sets the acting direction of the gravitational acceleration in the robot coordinate system CS1 based on the mounting posture of the robot base 11. The control unit 111 may cause the motors 41, 42, 43, 44, 45, 46 to generate a torque for gravity compensation based on the set acting direction of the gravitational acceleration.

The mounted state detection unit 118 may detect the rattling of the robot base 11 based on the sensor information of the sensor 61. The mounted state detection unit 118 may cause the display device 197 (described later) or the like to display that rattling is detected when the rattling is detected. For example, the mounted state detection unit 118 detects the vibration of the sensing position 51a based on the acceleration indicated by the sensor information of the sensor 61, and detects the rattling in the robot base 11 based on the detection result of the vibration.

A calibration unit 119 executes calibration of the first position information based on a comparison between the information related to the state of the first link and the first sensor information acquired from the first sensor. For example, the calibration unit 119 estimates the acceleration of the sensing position 52a based on the model information of the robotic arm 10, the rotational acceleration of the motor 41, and the position information of the sensor 62, and calculates the difference from the sensor information acquired from the acceleration, the estimation result, and the sensor 62. The calibration unit 119 calibrates the position information of the sensor 62 so as to reduce the difference, and stores the calibration result in the position information memory 113.

The calibration unit 119 estimates the acceleration of the sensing position 53a based on the model information of the robotic arm 10, the rotational acceleration of the motor 41, the rotational acceleration of the motor 42, and the position information of the sensor 63, and calculates the difference from the sensor information acquired from the acceleration, the estimation result, and the sensor 63. The calibration unit 119 calibrates the position information of the sensor 63 so as to reduce the difference, and stores the calibration result in the position information memory 113.

The calibration unit 119 estimates the acceleration of the sensing position 54a based on the model information of the robotic arm 10, the rotational acceleration of the motor 41, the rotational acceleration of the motor 42, the rotational acceleration of the motor 43, and the position information of the sensor 64, and calculates the difference from the sensor information acquired from the acceleration, the estimation result, and the sensor 64. The calibration unit 119 calibrates the position information of the sensor 64 so as to reduce the difference, and stores the calibration result in the position information memory 113.

The calibration unit 119 estimates the acceleration of the sensing positions 55a, 56a based on the model information of the robotic arm 10, the rotational acceleration of the motor 41, the rotational acceleration of the motor 42, the rotational acceleration of the motor 43, the rotational acceleration of the motor 44, and the position information of the sensors 65, 66, and calculates the difference from the sensor information acquired from the acceleration, the estimation result, and the sensors 65, 66. The calibration unit 119 calibrates the position information of the sensors 65, 66 to reduce the difference, and stores the calibration result in the position information memory 113.

Figure 4:
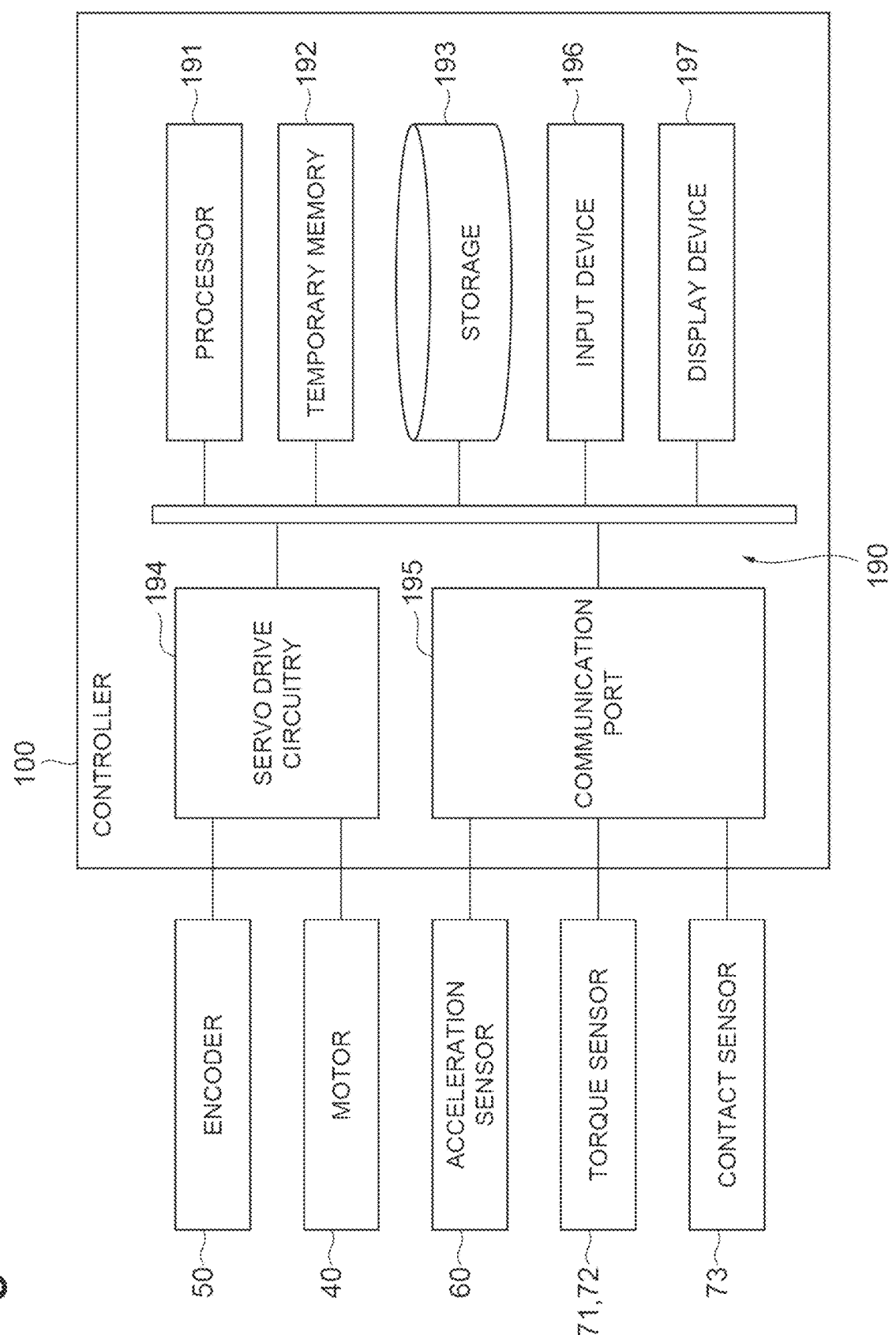
FIG. 4 is a block diagram illustrating an example hardware configuration of the controller.

FIG. 4 is a block diagram illustrating a hardware configuration of the controller 100. As illustrated in FIG. 4, the controller 100 includes circuitry 190. The circuitry 190 includes one or more processors 191, one or more temporary memories 192, one or more storages 193, servo drive circuitry 194, a communication port 195, an input device 196, and the display device 197.

The one or more storages 193 store a program for causing the controller 100 to execute: acquiring first sensor information from the first sensor; and correcting the first sensor information based on the first position information and the information related to the state of the first link. For example, one or more storages 193 store a program for configuring the above-described functional blocks in the controller 100.

The one or more temporary memories 192 temporarily store the program loaded from the one or more storages 193. The one or more processors 191 execute the program loaded in the one or more temporary memories 192 to configure the above-described functional blocks in the controller 100. The results of operations by the one or more processors 191 are stored in the one or more temporary memories 192 or the one or more storages 193.

The servo drive circuitry 194 acquires information of the rotational angle of the motor 40 from the encoder 50, and outputs driving power to the motor 40 based on commands from the one or more processors 191. The communication port 195 acquires sensor information from the sensor 60, the torque sensors 71, 72, and the contact sensor 73 based on commands from the one or more processors 191.

The input device 196 acquires an operation input by the user based on commands from the one or more processors 191. Examples of the input device 196 include a keyboard, a mouse, and a keypad. The display device 197 displays notification contents to the user based on commands from the one or more processors 191. Examples of the display device 197 include a liquid crystal monitor and an organic electro-luminescence (EL) monitor. The input device 196 may be integrated into the display device 197 as a so-called touch panel.

Sensing Method

As an example of the sensing method, an example sensing procedure executed by the controller 100 using the sensors 61, 62, 63, 64, 65, 66, the torque sensors 71, 72, and the contact sensor 73 will be described. This procedure includes: acquiring the first sensor information from the first sensor; and correcting the first sensor information based on the first position information and the information related to the state of the first link. The procedure may include a calibration procedure, a mounted state detection procedure, a vibration detection procedure, and an interpolation procedure. Hereinafter, each procedure will be described in detail.

Calibration Procedure

Figure 5:
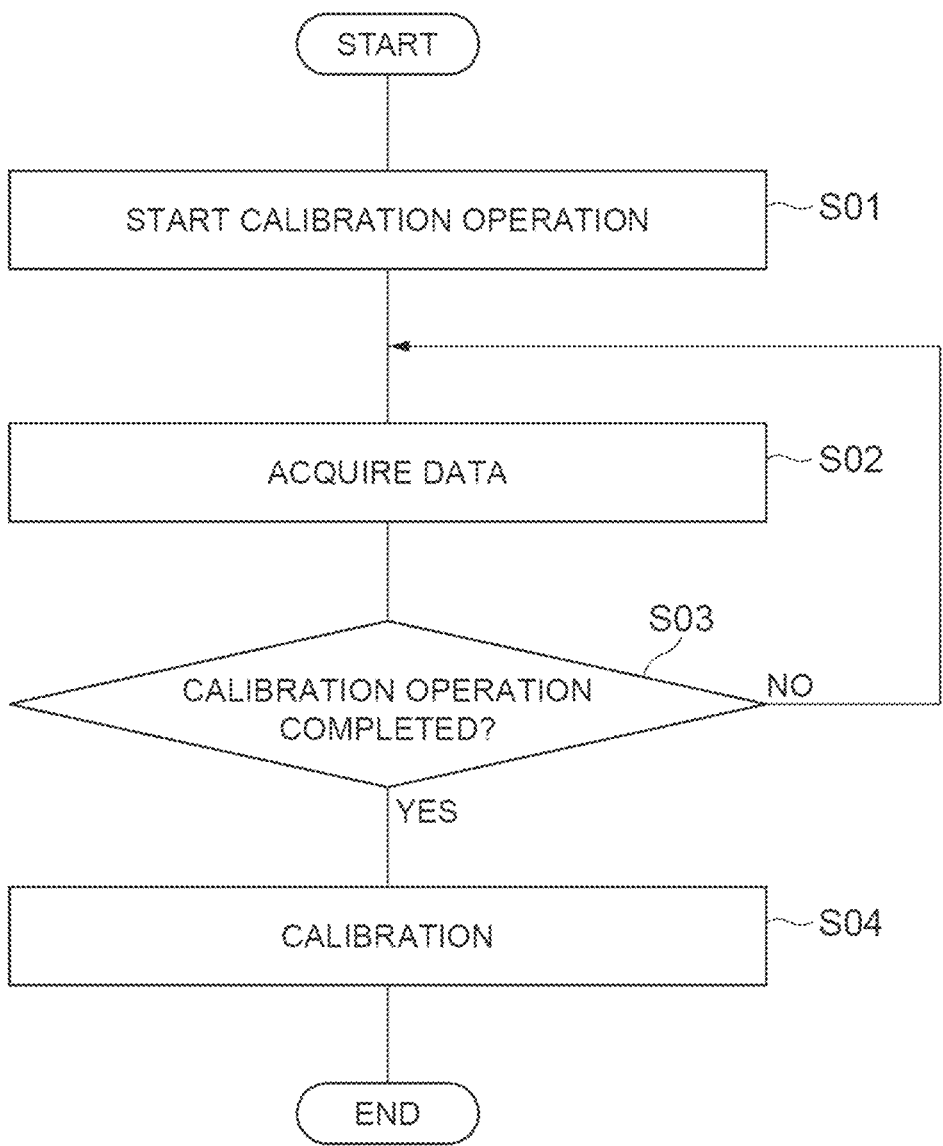
FIG. 5 is a flowchart illustrating an example calibration procedure.

This procedure is a procedure for calibrating the position information of the sensors 61, 62, 63, 64, 65, 66 stored in the position information memory 113. As illustrated in FIG. 5, the controller 100 executes operations S01, S02, S03. In the operation S01, the calibration unit 119 requests the control unit 111 to execute a calibration operation. The control unit 111 starts driving the motors 41, 42, 43, 44, 45, 46 so as to cause the robotic arm 10 to start a predetermined calibration operation. In the operation S02, the calibration unit 119 acquires the detection result of the rotational angle by the encoders 51, 52, 53, 54, 55, 56 and the sensor information from the sensors 61, 62, 63, 64, 65, 66. In the operation S03, the calibration unit 119 checks whether the calibration operation is completed.

If it is determined in the operation S03 that the calibration operation is not completed, the controller 100 returns the process to the operation S02. If it is determined in the operation S03 that the calibration operation is completed, the controller 100 executes a operation S04. In the operation S04, the calibration unit 119 calibrates the position information of the sensors 61, 62, 63, 64, 65, 66 based on data accumulated in operations S02, S03.

For example, the calibration unit 119 estimates the acceleration of the sensing position 52a based on the model information of the robotic arm 10, the rotational acceleration of the motor 41, and the position information of the sensor 62, and calibrates the position information of the sensor 62 based on the acceleration, the estimation result, and the sensor information acquired from the sensor 62. The calibration unit 119 estimates the acceleration of the sensing position 53a based on the model information of the robotic arm 10, the rotational acceleration of the motor 41, the rotational acceleration of the motor 42, and the position information of the sensor 63, and calibrates the position information of the sensor 63 based on the acceleration, the estimation result, and the sensor information acquired from the sensor 63. The calibration unit 119 estimates the acceleration of the sensing position 54a based on the model information of the robotic arm 10, the rotational acceleration of the motor 41, the rotational acceleration of the motor 42, the rotational acceleration of the motor 43, and the position information of the sensor 64, and calibrates the position information of the sensor 64 based on the acceleration, the estimation result, and the sensor information acquired from the sensor 64. The calibration unit 119 estimates the acceleration of the sensing positions 55a, 56a based on the model information of the robotic arm 10, the rotational acceleration of the motor 41, the rotational acceleration of the motor 42, the rotational acceleration of the motor 43, the rotational acceleration of the motor 44, and the position information of the sensors 65, 66, and calibrates the position information of the sensors 65, 66 based on the acceleration, the estimation result, and the sensor information acquired from the sensors 65, 66. The calibration unit 119 stores the calibration result of the position information of the sensors 61, 62, 63, 64, 65, 66 in the position information memory 113. Thus, the calibration procedure is completed.

Mounted State Detection Procedure

Figure 6:
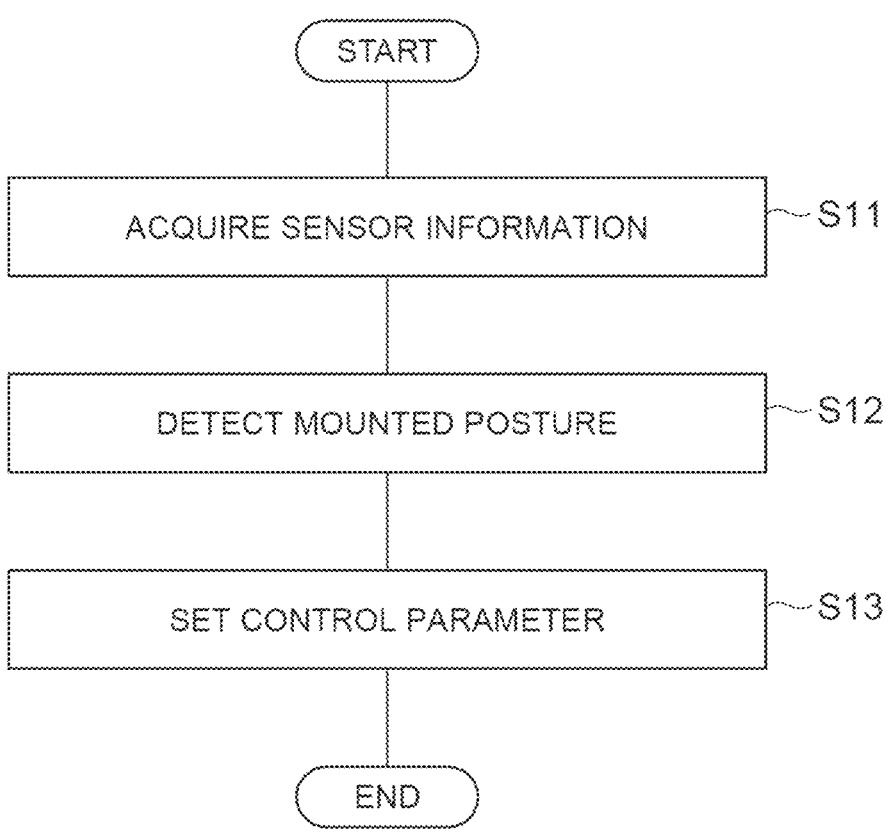
FIG. 6 is a flowchart illustrating an example mounted state detection procedure.

This procedure is a procedure for detecting the mounting posture of the robot base 11 as an example of the mounted state of the robot base 11. As illustrated in FIG. 6, the controller 100 executes operations S11, S12, S13. In the operation S11, the mounted state detection unit 118 acquires sensor information from the sensor 61. The mounted state detection unit 118 may acquire sensor information of the sensor 61 corrected by the sensor information correction unit 114.

In the operation S12, the mounted state detection unit 118 may detect the mounting posture in the robot base 11 based on the sensor information of the sensor 61. For example, the mounted state detection unit 118 recognizes the acting direction of the gravitational acceleration in the robot coordinate system CS1 based on the acceleration indicated by the corrected sensor information of the sensor 61, and detects the mounting posture in the robot base 11 based on the acting direction of the gravitational acceleration.

In the operation S13, the mounted state detection unit 118 sets the control parameter based on the mounting posture of the robot base 11. For example, the mounted state detection unit 118 sets the acting direction of the gravitational acceleration in the robot coordinate system CS1 based on the mounting posture of the robot base 11. Thus, the mounted state detection procedure is completed.

Vibration Detection Procedure

Figure 7:
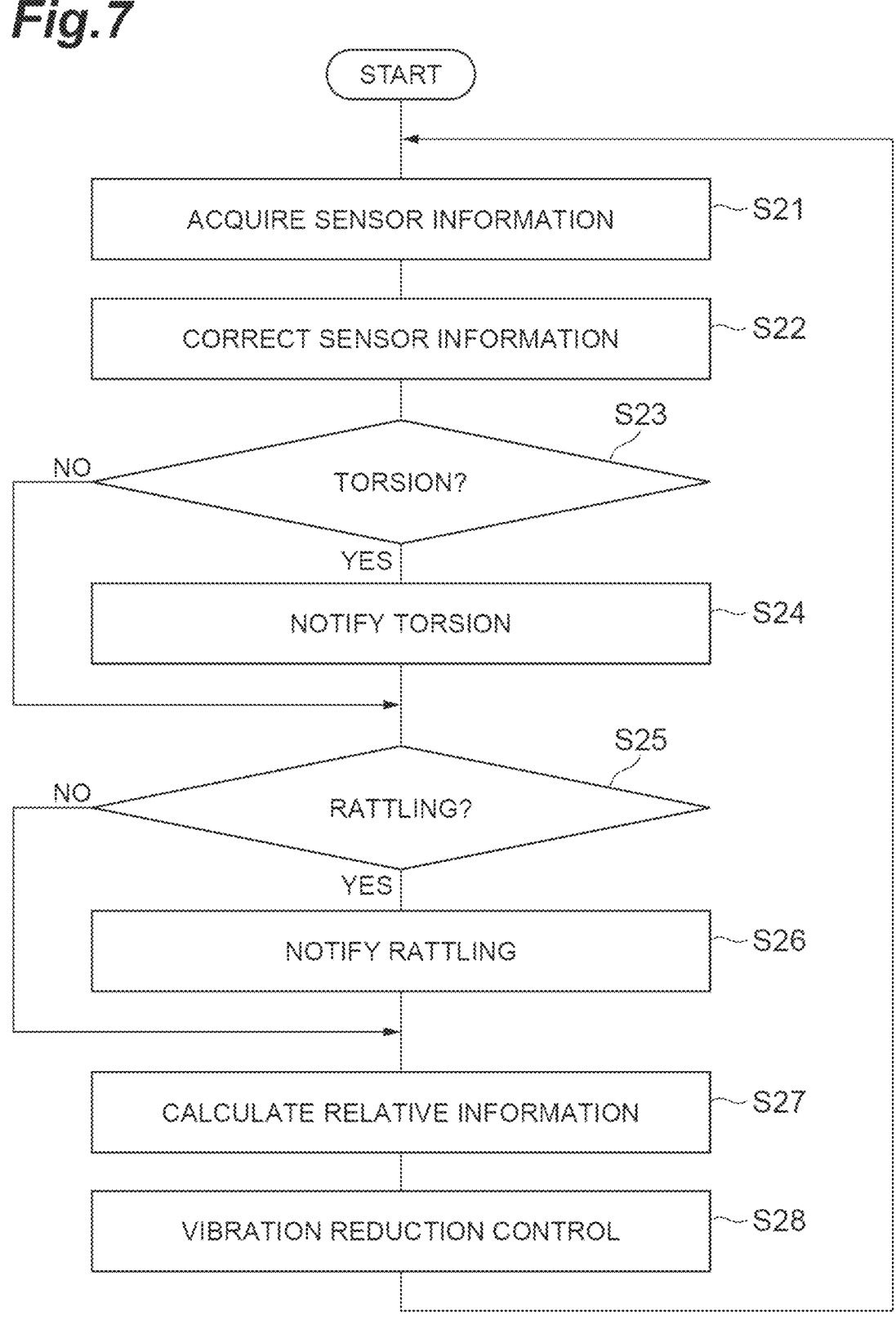
FIG. 7 is a flowchart illustrating an example vibration detection procedure.

This procedure is a procedure of detecting the relative vibration described above and controlling the robotic arm 10 so as to suppress the detected relative vibration. As illustrated in FIG. 7, the controller 100 executes operations S21, S22. In the operation S21, the sensor information acquisition unit 112 acquires sensor information from the sensors 61, 62, 63, 64, 65, 66. In the operation S22, the sensor information correction unit 114 corrects the sensor information of the sensors 61, 62, 63, 64, 65, 66 as described above.

For example, the sensor information correction unit 114 corrects the sensor information acquired from the sensor 62 to information independent of the posture of the sensor 62 (for example, sensor information indicated by a vector in the robot coordinate system CS1) based on the rotational angle of the pivoting portion 17. The sensor information correction unit 114 corrects the sensor information acquired from the sensor 63 to information independent of the posture of the sensor 63 (for example, sensor information indicated by a vector in the robot coordinate system CS1) based on the rotational angle of the arm 12 and the rotational angle of the pivoting portion 17. The sensor information correction unit 114 corrects the sensor information acquired from the sensor 64 to information independent of the posture of the sensor 64 (for example, sensor information indicated by a vector in the robot coordinate system CS1) based on the rotational angle of the arm base 18, the rotational angle of the arm 12, and the rotational angle of the pivoting portion 17. The sensor information correction unit 114 corrects the sensor information acquired from the sensors 65, 66 to information independent of the posture of the sensors 65, 66 (for example, sensor information indicated by a vector in the robot coordinate system CS1) based on the rotational angle of the arm end 19, the rotational angle of the arm base 18, the rotational angle of the arm 12, and the rotational angle of the pivoting portion 17.

The controller 100 then executes a operation S23. In the operation S23, the torsion detection unit 116 checks whether the arm 12 has torsion based on the corrected sensor information of the sensor 63 and the corrected sensor information of the sensor 62. If it is determined in the operation S23 that the arm 12 has torsion, the controller 100 executes a operation S24. In the operation S24, the torsion detection unit 116 causes the display device 197 or the like to display the detection of the torsion.

The controller 100 then executes a operation S25. If it is determined in the operation S23 that the arm 12 does not have torsion, the controller 100 executes the operation S25 without executing the operation S24. In the operation S25, the torsion detection unit 116 checks whether the robot base 11 has rattling based on the sensor information of the sensor 61. If it is determined in the operation S25 that the robot base 11 has rattling, the controller 100 executes a operation S26. In the operation S26, the torsion detection unit 116 causes the display device 197 or the like to display the detection of the rattling of the robot base 11.

The controller 100 then executes a operation S27. If it is determined in the operation S25 that the robot base 11 does not have rattling, the controller 100 executes the operation S27 without executing the operation S26. In the operation S27, the relative information calculation unit 115 calculates the relative sensor information.

For example, the relative information calculation unit 115 calculates the relative vibration of the sensing position 53*a* in which the vibration component corresponding to the vibration indicated by the corrected sensor information of the sensor 62 is excluded from the vibration indicated by the corrected sensor information of the sensor 63. For example, the relative information calculation unit 115 calculates the main relative vibration of the sensing position 53*a* and the sub relative vibration of the sensing position 53*a*. The relative information calculation unit 115 calculates the relative vibration of the sensing position 54*a* in which the vibration component corresponding to the vibration indicated by the corrected sensor information of the sensor 63 is excluded from the vibration indicated by the corrected sensor information of the sensor 64. For example, the relative information calculation unit 115 calculates the main relative vibration of the sensing position 54*a* and the sub relative vibration of the sensing position 54*a*. The relative information calculation unit 115 calculates the relative vibration of the sensing positions 55*a*, 56*a* in which the vibration component corresponding to the vibration indicated by the corrected sensor information of the sensor 64 is excluded from the vibration indicated by the corrected sensor information of the sensors 65, 66. For example, the relative information calculation unit 115 calculates the main relative vibration of the sensing positions 55*a*, 56*a* and the sub relative vibration of the sensing positions 55*a*, 56*a*.

The controller 100 then executes a operation S28. In the operation S28, the control unit 111 controls the robotic arm 10 so that the relative vibration is reduced. For example, the control unit 111 controls the motor 42 so as to reduce the main relative vibration of the sensing position 53*a*, and controls a motor other than the motor 42 (for example, the motor 41) so as to reduce the sub relative vibration of the sensing position 53*a*. The control unit 111 controls the motor 43 so as to reduce the main relative vibration of the sensing position 54*a*, and controls a motor other than the motor 43 (for example, the motor 41, 42) so as to reduce the sub relative vibration of the sensing position 54a. The control unit 111 controls the motor 44 so as to reduce the main relative vibration of the sensing positions 55a, 56a, and controls a motor other than the motor 44 (for example, the motors 41, 42, 43) so as to reduce the sub relative vibration of the sensing positions 55a, 56a. The controller 100 repeats the above procedure.

Interpolation Procedure

Figure 8:
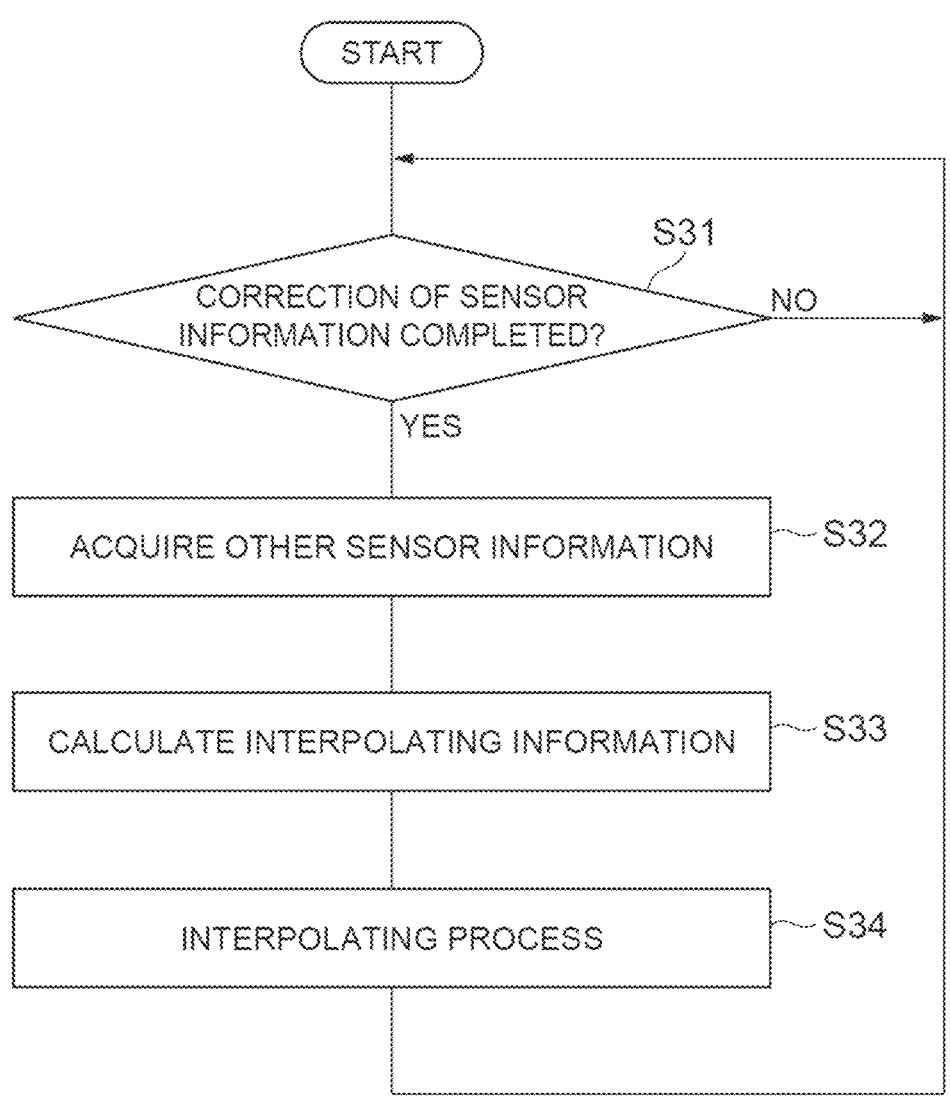
FIG. 8 is a flowchart illustrating an example interpolation procedure.

This procedure is a procedure for interpolating other sensor information based on the sensor information corrected by the sensor information correction unit 114. As illustrated in FIG. 8, the controller 100 executes operations S31, S32. In the operation S31, the interpolation unit 117 waits for correction of sensor information by the sensor information correction unit 114 (for example, correction of sensor information in the operation S22). In the operation S32, the interpolation unit 117 acquires other sensor information from the torque sensor 71, 72 and the contact sensor 73.

The controller 100 then executes operations S33, S34. In the operation S33, the interpolation unit 117 calculates information for interpolating the other sensor information. For example, the interpolation unit 117 calculates high frequency components of the torque acting on the joint 32 based on the acceleration indicated by the corrected sensor information of the sensor 63. The interpolation unit 117 calculates high frequency components of the torque acting on the joint 33 based on the acceleration indicated by the corrected sensor information of the sensor 64. The interpolation unit 117 calculates the acting direction of the reaction force from a peripheral object based on the acceleration indicated by the corrected sensor information of the sensors 65, 66. In the operation S34, the interpolation unit 117 interpolates the other sensor information. For example, the interpolation unit 117 adds the calculation result of the high frequency components of the torque acting on the joint 32 to the torque indicated by the sensor information of the torque sensor 71. The interpolation unit 117 adds the calculation result of the high frequency components of the torque acting on the joint 33 to the torque indicated by the sensor information of the torque sensor 72. The interpolation unit 117 adds the calculation result of the acting direction of the reaction force from the peripheral object to the sensor information of the contact sensor 73.

As described above, the robot system 1 includes: the first link that is a part of the robotic arm 10; the first motor 40 moving with the rotation of the first link; the first sensor 60 whose relative position is fixed with respect to a reference position related to the first motor 40; and the memory configured to store a first position information indicating the relative position of the first sensor 60 with respect to the reference position related to the first motor 40.

In a case where the relative position of the first sensor 60 with respect to the first motor 40 is unknown, it is also unknown which direction the first sensor information acquired from the first sensor 60 relates to. Accordingly, it is difficult to utilize the first sensor information. On the other hand, with the robot system 1, since the first position information is stored in the memory, it is readily specified which direction the first sensor information is related to, based on the first position information. Accordingly, the sensor information in the robot is further utilized.

The robot system 1 may further include the sensor information correction unit 114 configured to correct the first sensor information acquired from the first sensor 60 based on the first position information and information related to the state of the first link. Based on the first position information and the state of the first link, the first sensor information can further be utilized.

The robot system 1 may further include a second link rotatably supporting the first link, and the sensor information correction unit 114 may be configured to correct the first sensor information acquired from the first sensor 60 based on the first position information, the information related to the state of the first link, and the information related to the state of the second link. Based on the first position information, the state of the first link, and the state of the second link, the first sensor information can further be utilized.

The robot system 1 may further include: a second motor 40 rotating the first link; and a second sensor 60 whose relative position is fixed with respect to a reference position related to the second motor 40, the memory may be configured to further store second position information indicating the relative position of the second sensor 60 with respect to the second motor 40, and the sensor information correction unit 114 may be configured to correct the second sensor information acquired from the second sensor 60 based on the second position information. By correcting both the first sensor information and the second sensor information, the first sensor information and the second sensor information can readily be combined.

The sensor information correction unit 114 may be configured to correct the first sensor information and the second sensor information to information in a common coordinate system. By correcting the first sensor information and the second sensor information to information in the common coordinate system, the first sensor information and the second sensor information can further readily be combined.

The robot system 1 may further include the relative information calculation unit 115 configured to calculate relative sensor information in which a component corresponding to the second sensor information is excluded from the first sensor information based on the first sensor information corrected by the sensor information correction unit 114 and the second sensor information corrected by the sensor information correction unit 114. Examples of the relative sensor information include a relative acceleration of a fixed position of the first sensor 60 with respect to a fixed position of the second sensor 60, a relative vibration of a fixed position of the first sensor 60 with respect to a fixed position of the second sensor 60, and the like. These pieces of relative sensor information can be used for detection of a phenomenon that has occurred between the first sensor 60 and the second sensor 60, control of a site between the first sensor 60 and the second sensor 60, and the like.

The relative information calculation unit 115 may calculate, as the relative sensor information, the relative vibration in which the vibration component corresponding to the vibration indicated by the second sensor information is excluded from the vibration indicated by the first sensor information, and the robot system 1 may further include the control unit 111 configured to control the robotic arm 10 so that the relative vibration decreases. The detection result of the relative vibration can be used to reduce the vibration.

The relative information calculation unit 115 may be configured to calculate, as the relative vibration, the main relative vibration along a movement direction of the first sensor 60 by the second motor 40, and the control unit 111 may be configured to control the second motor 40 so that the main relative vibration decreases. The detection result of the relative vibration can be utilized for control to reduce the vibration by the second motor 40.

The relative information calculation unit 115 may be configured to calculate, as the relative vibration, a sub relative vibration along a direction intersecting the movement direction of the first sensor 60 by the second motor 40, and the control unit 111 may be configured to control the motor 40 other than the second motor 40 so that the sub relative vibration decreases. The detection result of the relative vibration can be further utilized to suppress the sub relative vibration which cannot be reduced in the second motor 40.

The system may further include the torsion detection unit 116 configured to detect torsion of the first link based on the first sensor information corrected by the sensor information correction unit 114 and the second sensor information corrected by the sensor information correction unit 114. A combination of the first sensor information and the second sensor information may be used to detect the torsion of the first link.

The sensor information correction unit 114 may be configured to correct the first sensor information to information independent of the posture of the first sensor 60 based on the first position information and the rotational angle of the first link. The first sensor information can be used to detect a phenomenon different from the posture change of the first sensor 60.

The first sensor 60 may be an acceleration sensor, and the sensor information correction unit 114 may be configured to correct the first sensor information to information independent of gravity. Acceleration of the fixed position of the first sensor 60 can further reliably be detected.

The sensor information correction unit 114 may be configured to correct the first sensor information to information independent of the rotational acceleration of the first link based on the first position information and the rotational acceleration of the first link. The first sensor information can be used to detect a phenomenon different from the rotation of the first link, such as deflection of the first link.

The sensor information correction unit 114 may correct the first sensor information to information independent of the rotational speed of the first link based on the first position information and the rotational speed of the first link. The first sensor information can be used to detect a phenomenon different from the rotation of the first link, such as deflection of the first link.

The system may further include the sensor information correction unit 114 configured to interpolate other sensor information acquired from another sensor based on the first sensor information corrected by the interpolation unit 117. The first sensor information corrected by the sensor information correction unit 114 may be used to interpolate the other sensor information.

The first sensor 60 may be an acceleration sensor, the other sensor may be a torque sensor, and the interpolation unit 117 may be configured to interpolate the torque indicated by the other sensor information based on the acceleration indicated by the first sensor information corrected by the sensor information correction unit 114. The acceleration sensor tends to be able to respond to a change in a higher frequency, compared to the torque sensor. By using this property, the torque indicated by other sensor information can be interpolated based on the acceleration indicated by the first sensor information corrected by the sensor information correction unit 114.

The first sensor 60 may be an acceleration sensor, the other sensor may be a contact sensor that detects a contact with a peripheral object, and the interpolation unit 117 may be configured to add an acting direction of a reaction force from the peripheral object to the other sensor information based on the acceleration indicated by the first sensor information corrected by the sensor information correction unit 114. With the contact sensor 60, although the contact with the peripheral object can be detected, the acting direction of the reaction force from the peripheral object may not be detected. On the other hand, according to the acceleration sensor 60, it may be detected that some kind of acceleration has occurred, but it may not be detected that this is due to contact with the peripheral object. In contrast, by combining the contact with the peripheral object indicated by the other sensor information and the acceleration indicated by the sensor information, the acting direction of the reaction force from the peripheral object can readily be added to the other sensor information.

The system may further include: the robot base 11 supporting the first link; the base motor 40 fixed to the robot base 11; the base sensor 60 whose relative position is fixed with respect to a reference position related to the base motor 40; and the mounted state detection unit 118 configured to detect a mounted state of the robot base 11 based on base sensor information acquired from the base sensor 60. The base sensor information can be used to detect the mounted state of the robot base 11.

The base sensor 60 may be an acceleration sensor, and the mounted state detection unit 118 may be configured to detect the mounting posture of the robot base 11 based on the base sensor information. The base sensor information can be utilized to detect the mounting posture of the robot base 11.

The mounted state detection unit 118 may be configured to detect the rattling of the robot base 11 based on the base sensor information. The base sensor information can be utilized to detect rattling in the robot base 11.

The robot system 1 may further include the calibration unit 119 configured to calibrate the first position information based on a comparison between the information related to the state of the first link and the first sensor information acquired from the first sensor 60. The reliability of the first position information can be improved by the calibration. Thus, the first sensor information can be used more effectively.

The apparatus may further include the first encoder 50 that is fixed to the first motor 40 and configured to detect rotation of the first motor 40, and the first sensor 60 may be built into the first encoder 50. The first sensor 60 can be easily placed on the robotic arm 10.

The first encoder 50 may include the integrated circuit 84 configured to calculate a rotational angle of the first motor 40, and the first sensor 60 may be included in the integrated circuit 84. By including the first sensor 60 in the integrated circuit 84, the distance over which the first sensor information is transmitted can be shortened, and the noise tolerance of the first sensor information can be increased. When the first sensor 60 is included in the integrated circuit 84 of the encoder 50, the first sensor 60 moves together with the encoder 50, but the influence of the movement can be reduced by the sensor information correction unit 114. Accordingly, both the noise resistance of the first sensor information and the utilization of the first sensor information can be achieved.

The first sensor 60 may include a MEMS device formed in the integrated circuit 84. Various kinds of the first sensor 60 can be included in the integrated circuit 84.

The first sensor 60 may include: the sensing unit 85 configured to convert a sensing target into an analog signal; and an AD conversion circuit 86 configured to convert the analog signal into a digital signal. Since all the processes from the detection of the first sensor information to the conversion into a digital signal can be executed in the integrated circuit 84, the noise resistance can be further improved.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A robot system comprising:

a first link that is a part of a robotic arm;

a first motor that moves according to a rotation of the first link;

a first sensor having a fixed location with respect to the first motor;

a memory configured to store first position information indicating a relative position of the first sensor with respect to the first motor; and circuitry configured to:

correct first sensor information acquired from the first sensor based on the first position information and status information of the first link; and control the robotic arm based on the corrected first sensor information.

2. The robot system according to claim 1, further comprising a second link that is a part of the robotic arm, wherein the first link is connected to the second link and rotatable with the second link, wherein the circuitry is configured to correct the first sensor information acquired from the first sensor based on the first position information, the status information of the first link, and status information of the second link.

3. The robot system according to claim 1, further comprising:

a second motor configured to rotate a part of the robotic arm including the first link; and a second sensor having a fixed location with respect to the second motor, wherein the memory further stores second position information indicating a relative position of the second sensor with respect to the second motor, and wherein the circuitry is configured to correct second sensor information acquired from the second sensor based on the second position information.

4. The robot system according to claim 3, wherein each of the first sensor and the second sensor is an acceleration sensor, and wherein the circuitry is further configured to:

calculate a component that is included in the corrected first sensor information and that is related to the corrected second sensor information, based on the corrected second sensor information, motion of the part of the robotic arm caused by the second motor, and the first position information; and calculate relative sensor information by excluding the calculated component from the corrected first sensor information.

5. The robot system according to claim 3, wherein the circuitry is further configured to:

detect a vibration of the first sensor based on the corrected first sensor information;

detect a vibration of the second sensor based on the corrected second sensor information;

calculate relative vibration by excluding a vibration component related to the detected vibration of the second sensor from the detected vibration of the first sensor; and control the robotic arm to reduce the relative vibration.

6. The robot system according to claim 5, wherein the first sensor moves in a movement direction together with the first motor when the first link is rotated by the second motor, wherein the circuitry is configured to calculate the relative vibration including a main relative vibration that occurs in the movement direction, and wherein the circuitry is configured to control the second motor to reduce the main relative vibration.

7. The robot system according to claim 6, wherein the first sensor moves in a direction intersecting the movement direction when the first link is rotated by another motor, wherein the circuitry is configured to calculate the relative vibration including a sub relative vibration that occurs in the direction intersecting the movement direction, and wherein the circuitry is further configured to control the other motor to reduce the sub relative vibration.

8. The robot system according to claim 3, wherein the circuitry is further configured to detect torsion of the first link based on the corrected first sensor information and the corrected second sensor information.

9. The robot system according to claim 1, wherein the circuitry is configured to correct the first sensor information into a coordinate system that is independent of a posture of the first sensor based on the first position information and a rotational angle of the first link.

10. The robot system according to claim 1, wherein the circuitry is configured to correct the first sensor information to be independent of a rotational acceleration of the first link based on the first position information and the rotational acceleration of the first link.

11. The robot system according to claim 1, wherein the circuitry is configured to correct the first sensor information to be independent of a rotational speed of the first link based on the first position information and the rotational speed of the first link.

12. The robot system according to claim 1, further comprising a first encoder fixed to the first motor and configured to detect rotation of the first motor, wherein the first sensor is built into the first encoder.

13. The robot system according to claim 12, wherein the first encoder comprises an integrated circuit configured to calculate a rotational angle of the first motor, and wherein the first sensor is included in the integrated circuit.

14. The robot system according to claim 13, wherein the first sensor comprises:

a sensor head configured to convert a sensing target into an analog signal; and an AD conversion circuit configured to convert the analog signal into a digital signal.

15. The robot system according to claim 1, further comprising one or more other motors each configured to drive the robotic arm including the first link, wherein the first sensor is an acceleration sensor, and wherein the circuitry is further configured to:

calculate a component that is included in the first sensor information and that is related to a motion of the first link generated by the one or more other motors based on a status of the one or more other motors and the first position information; and calculate the corrected first sensor information by excluding at least part of the calculated component from the first sensor information.

16. A robot system comprising:

a robotic arm link;

a motor that moves according to a rotation of the robotic arm link;

an acceleration sensor having a fixed location with respect to the motor;

a memory configured to store position information indicating a relative position of the acceleration sensor with respect to the motor; and circuitry configured to correct sensor information acquired from the acceleration sensor based on the position information and status information of the robotic arm link.

17. The robot system according to claim 16, further comprising a torque sensor, wherein the circuitry is configured to interpolate torque information acquired by the torque sensor based on the corrected first sensor information.

18. The robot system according to claim 16, further comprising a contact sensor configured to detect contact with a peripheral object, wherein the circuitry is configured to add an acting direction of a reaction force from the peripheral object to contact information acquired by the contact sensor, based on the corrected sensor information.

19. A robot system comprising:

a first link that is a part of a robotic arm;

a first motor that moves according to a rotation of the first link;

a first sensor having a fixed location with respect to the first motor;

a second motor configured to rotate a part of the robotic arm including the first link;

a second sensor having a fixed location with respect to the second motor;

a memory configured to store first position information indicating a relative position of the first sensor with respect to the first motor and second position information indicating a relative position of the second sensor with respect to the second motor; and circuitry configured to:

calculate a relative vibration of the first sensor relative to the second sensor based on first sensor information acquired from the first sensor, second sensor information acquired from the second sensor, the stored first position information, and the stored second position information; and control the robotic arm to reduce the relative vibration.

20. The robot system according to claim 19, wherein the circuitry is further configured to:

detect a vibration of the first sensor based on the first sensor information; and detect a vibration of the second sensor based on the second sensor information, and wherein the relative vibration is calculated by excluding a vibration component related to the detected vibration of the second sensor from the detected vibration of the first sensor.

* * * * *